United States Patent
Atungsiri

(10) Patent No.: US 8,170,127 B2
(45) Date of Patent: May 1, 2012

(54) RECEIVER AND METHOD OF RECEIVING

(75) Inventor: Samuel Asangbeng Atungsiri, Basingstoke (GB)

(73) Assignee: Sony Corporation, Tokyo (JP)

(*) Notice: Subject to any disclaimer, the term of this patent is extended or adjusted under 35 U.S.C. 154(b) by 82 days.

(21) Appl. No.: 12/782,991

(22) Filed: May 19, 2010

(65) Prior Publication Data

US 2010/0310017 A1 Dec. 9, 2010

(30) Foreign Application Priority Data

Jun. 3, 2009 (GB) .................................. 0909628.0

(51) Int. Cl.
*H04K 1/10* (2006.01)
*H04L 27/28* (2006.01)

(52) U.S. Cl. ........ 375/260; 375/267; 370/203; 370/208; 370/210

(58) Field of Classification Search .................. 375/260, 375/267; 370/203–211
See application file for complete search history.

(56) References Cited

U.S. PATENT DOCUMENTS

| 7,177,376 | B2 | 2/2007 | Atungsiri et al. |
| 7,440,506 | B2 | 10/2008 | Atungsiri et al. |
| 2009/0296838 | A1 | 12/2009 | Atungsiri et al. |
| 2009/0296840 | A1 | 12/2009 | Atungsiri et al. |
| 2010/0266062 | A1* | 10/2010 | Mussmann et al. ........... 375/267 |

FOREIGN PATENT DOCUMENTS

| EP | 1 950 923 A2 | 7/2008 |
| WO | WO 2009/030895 A2 | 3/2009 |
| WO | WO 2009/030895 A3 | 3/2009 |

OTHER PUBLICATIONS

U.S. Appl. No. 12/435,657, filed May, 5, 2009, Atungsiri, et al.
U.S. Appl. No. 12/437,207, filed May 7, 2009, Atungsiri, et al.
U.S. Appl. No. 12/782,165, filed May 18, 2010, Okehie, et al.
U.S. Appl. No. 12/829,907, filed Jul. 2, 2010, Atungsiri.

* cited by examiner

*Primary Examiner* — Curtis Odom
(74) *Attorney, Agent, or Firm* — Oblon, Spivak, McClelland, Maier & Neustadt, L.L.P.

(57) ABSTRACT

A receiver detects and recovers data from Orthogonal Frequency Division Multiplexed (OFDM) symbols, which are transmitted as first and second versions to form a multiple input multiple output (MISO) system and carry pairs of data symbols encoded to form Alamouti cells. A channel estimator and corrector is arranged to form an estimate of the data symbols by generating an estimate of first and second channels. A receiver includes a channel estimator and corrector comprising a pilot data extractor for extracting the pilot data from the OFDM symbols, a frequency dimension interpolator for interpolating between the pilot data received from each of the OFDM symbols in the frequency domain to form sum pilot data and difference pilot data, a sum and difference decoder for combining the sum and difference pilot data to form for each data symbol of the Alamouti pairs an estimate of a sample of the first channel and an estimate of the sample of the second channel, and an Alamouti decoder. The Alamouti decoder receives the data bearing sub-carriers from the OFDM symbols and estimates the data symbols.

15 Claims, 12 Drawing Sheets

110.1

FIG. 2: MISO encoding, transmission and reception

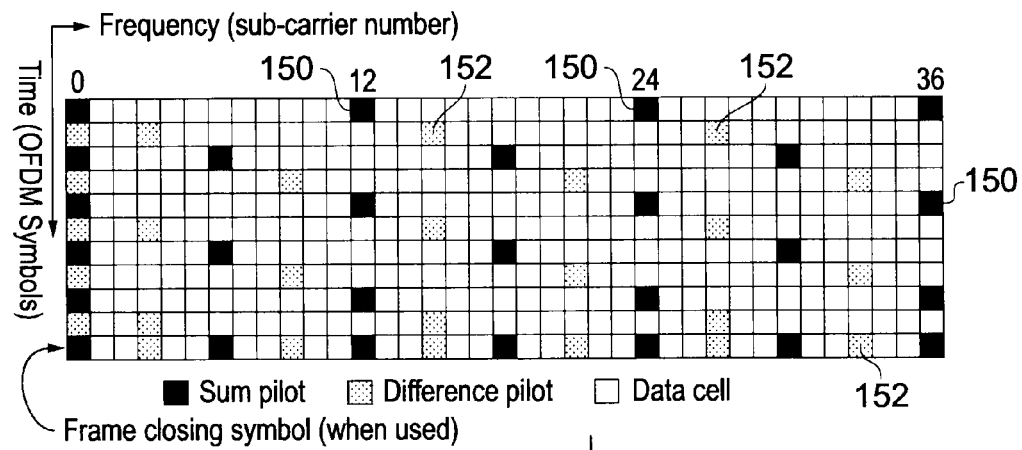
FIG. 5a
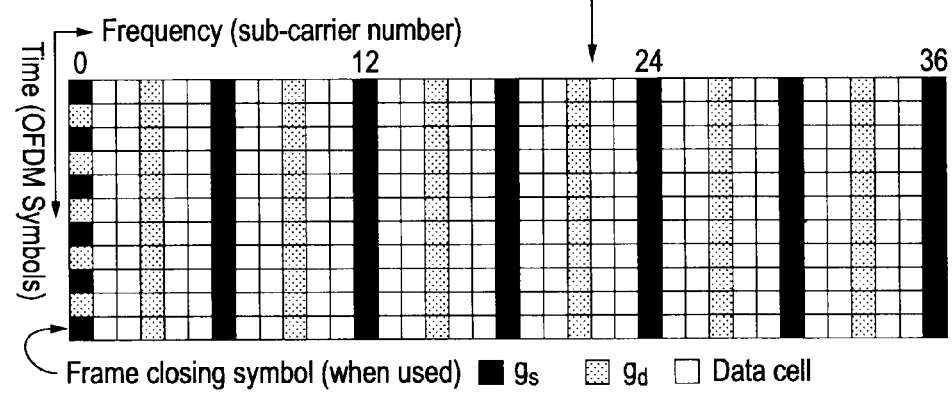
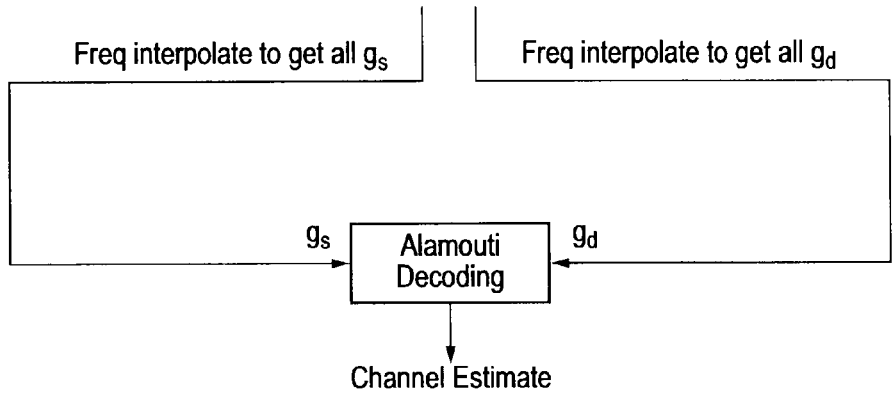
FIG. 5b

Temporal Interpolation-based MISO channel
estimation and correction (TB-MCHC)

Frequency-only MISO channel
estimation and correction

Channel estimate de-noising and noise filter blocks

FO-MCHC for use with P2 and frame closing symbols

RECEIVER AND METHOD OF RECEIVING

FIELD OF INVENTION

The present invention relates to receivers and methods for detecting and recovering data from Orthogonal Frequency Division Multiplexed (OFDM) symbols, the OFDM symbols including a plurality of data bearing sub-carriers on which data is transmitted and a plurality of pilot bearing sub-carriers on which pilot data is transmitted. Moreover, each of the OFDM symbols is received after being transmitted as a first version of the OFDM symbol via a first channel and a second version of the OFDM symbol via a second channel to form a multiple input-single output (MISO) system. Furthermore symbols of the data carried by the sub-carriers of the OFDM symbols are paired to form Alamouti cells.

BACKGROUND OF THE INVENTION

There are many examples of radio communications systems in which data is communicated using Orthogonal Frequency Division Multiplexing (OFDM). Systems which have been arranged to operate in accordance with Digital Video Broadcasting (DVB) standards for example, utilise OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

Multiple-Input Single-Output (MISO) is a technique which can be used in combination with Alamouti encoding to improve the robustness with which data can be received. Alamouti encoding forms pairs of data symbols, which are then differently encoded for communication via each of the channels. MISO/Alamouti encoding can therefore be used in combination to form robust and effective communication of data, and in particular when used with OFDM. However, in order to decode Alamouti encoded data cells it is necessary to form an estimate of each channel through which each version of the OFDM symbols of the MISO system have passed. To this end, it is known to include pilot data which is conveyed by sub-carriers of the OFDM symbols assigned for this purpose. For example, the DVB-T2 system has been designed to include pilot patterns to allow the system to be deployed in a MISO mode and to utilise Alamouti encoding, as disclosed in "ETSI EN 300 755, "Digital Video Broadcasting (DVB): Frame structure, channel coding and modulation for a second generation digital terrestrial television broadcasting system (DVB-T2)", May 2008.

Detecting and recovering data from OFDM symbols which have been transmitted in accordance with a MISO/Alamouti encoding system represents a technical problem, in particular when the receiver is required to generate an estimate of each of the first and second channels via which the OFDM symbols are received.

SUMMARY OF INVENTION

According to an aspect of the present invention there is provided a receiver for detecting and recovering data from Orthogonal Frequency Division Multiplexed (OFDM) symbols. The OFDM symbols include a plurality of data bearing sub-carriers on which data is transmitted and a plurality of pilot bearing sub-carriers on which pilot data is transmitted. Each of the OFDM symbols is received after being transmitted as a first version of the OFDM symbols via a first channel and a second version of the OFDM symbols via a second channel, which thereby form a multiple input-single output (MISO) system. Furthermore the symbols of the data carried by the sub-carriers of the OFDM symbols are paired to form Alamouti cells, the pairs of data symbols having been encoded differently for the first and second versions of the OFDM symbols in accordance with an Alamouti-type encoding and at least some of the pilot data from the second version is inverted with respect to the corresponding pilot data of the first version of the OFDM symbols. The receiver comprises a demodulator arranged in operation to detect a signal representing the OFDM symbols, and to generate a sampled version of the OFDM symbols in the time domain, a Fourier transform processor arranged in operation to form a frequency domain version of the OFDM symbols, and a channel estimator and corrector. The channel estimator and corrector comprises a pilot data extractor which is arranged to extract the pilot data from the OFDM symbols, a frequency domain interpolator which is arranged in operation to interpolate between the pilot data received from each the OFDM symbols in the frequency domain to form sum pilot data and difference pilot data, a sum and difference decoder which is arranged in operation to combine the sum and difference pilot data to form for each pair of data symbols of the Alamouti cells an estimate of a sample of the first channel and an estimate of the sample of the second channel, and an Alamouti decoder. The Alamouti decoder is arranged to receive the data bearing sub-carriers from the OFDM symbols and to estimate the data symbols by performing Alamouti decoding using the estimates of the samples for the first and second channels.

Embodiments of the present invention can find application in a communications system in which data symbols are carried by OFDM symbols in a MISO system. In a MISO system the OFDM symbols are formed into first and second versions and each version is transmitted via first and second antenna to a receiver. At the single antenna receiver the OFDM symbols are received contemporaneously and therefore appear as if combined during transmission via the different channels. To provide a facility which will allow the data symbols to be recovered, the data symbols are paired and encoded as Alamouti cells, each cell being formed differently on the first and second version of the OFDM symbols.

Alamouti-type encoding is used to refer all forms of Alamouti encoding including the classical Alamouti encoding, and a modified Alamouti encoding as used for example in DVB-T2, wherein the symbol order of a pair of symbols is not reversed in the second of the two transmissions as would be required for normal Alamouti encoding. On the decoding side, classical Alamouti decoding assumes that the channel does not change between the received pairs of symbols of the Alamouti cell, whereas non-classical allows a possibility that the change has changed.

In order to estimate the first and second channels through which the first and second versions of the OFDM symbols have passed, each version of the OFDM symbols include pilot data carried on pilot sub-carriers. In some of the second versions of the OFDM symbols the pilot data cells are inverted with respect to the first version. As such the pilot data is received, when combined at the receiver antenna as sum pilot data and difference pilot data depending on whether the pilot data of the second version of the OFDM symbol is non-inverted or inverted respectively.

Embodiments of the present invention provide a receiver for detecting and recovering data from OFDM symbols, which have been encoded and transmitted in accordance with a MISO/Alamouti encoded system, using frequency only interpolation. As such, data can be detected more rapidly and the receiver implementation can be simplified.

In one example, the OFDM symbols include odd OFDM symbols and even OFDM symbols and for one of the odd and even symbols the second transmitted version is arranged to include inverted pilot data providing pilot data which is inverted with respect to the pilot data in the first version. That is to say, the OFDM symbols may be thought of as pairs of successive OFDM symbols so that successive OFDM symbols are treated differently by the receiver. The first OFDM symbol of the pair may be referred to as an even OFDM symbol and may carry the sum pilot data, because the second version of the OFDM symbol carries non-inverted pilots, so that when the even OFDM symbols are formed at the receiver the pilots sum. The second OFDM symbol of the pair of successive OFDM symbols may be referred to as an odd OFDM symbol and may carry difference pilot data, because the second version of the OFDM symbol carries inverted pilots, so that when the odd OFDM symbols are formed at the receiver the pilots subtract.

Embodiments of the present invention can provide a receiver with a channel estimator and corrector which includes a delay element which is arranged to receive the OFDM symbols and to store the pilot data from the odd or even OFDM symbol. A frequency only interpolator is arranged to interpolate the pilot data in the frequency domain for a current one of the odd and even OFDM symbols and to interpolate the pilot data in the frequency domain for the other of the odd and even OFDM symbols stored by the delay element to form the sum pilot data and the difference pilot data from the odd and even OFDM symbols. As such, frequency only interpolation is arranged to provide sum and difference pilot data for each data bearing sub-carrier of the odd and even symbols, by assuming that the channel does not change substantially between successive symbols. Alamouti decoding can then be successfully applied to recover an estimate of the data for each of the Alamouti cells conveyed by the odd and even OFDM symbols.

In some examples the estimates of the channel samples for the first and second channels for each of the data symbols of the Alamouti cell are combined to generate an estimate of the channel state information (CSI) within the Alamouti decoder. This channel state information ($\rho$) can be used to provide a simple and yet accurate assessment of the state of the channel for use with decoding the symbols communicated in the OFDM symbol, such as for example where the data symbols have been encoded with an error correction code, in which the CSI is used as a metric of received signal quality and for turbo decoding for example.

In other examples the presence of inverted and non-inverted pilots within the same OFDM symbol can be sufficient to provide an accurate estimate of the sum and difference components of the pilot data, and so no delay between successive symbols is required. For example when detecting and recovering data from a P2 symbol or a frame closing symbol according to the DVB-T2 standard, because these OFDM symbols have a sufficient density of pilot data to allow enough sum and difference pilot data to be recovered from one OFDM symbol, there is no requirement to delay one OFDM symbol with respect to a current OFDM symbol, because frequency interpolation can be performed within the OFDM symbol.

Various further aspects and features of the present invention are defined in the appended claims and include a method of detecting and recovering data from OFDM symbols.

BRIEF DESCRIPTION OF DRAWINGS

Embodiments of the present invention will now be described by way of example only with reference to the accompanying drawings in which like parts are identified by the same numerical designations and in which:

FIG. 5a is a schematic representation of the encoding of the pilot data symbols for respective versions of the OFDM symbols transmitted by the transmitter shown in FIG. 1; whereas FIG. 5b illustrates a process of performing temporal interpolation on the pilot data symbols shown in FIG. 5a;

FIG. 9b is an illustrative representation of an effect of interpolating between the pilot shown in FIG. 9a;

DESCRIPTION OF PREFERRED EMBODIMENTS

Example embodiments of the present invention are described in the following paragraphs with reference to a receiver operating in accordance with the DVB-T2 standard, although it will be appreciated that embodiments of the present find application with other DVB standards and radio communications systems which utilise OFDM and/or MISO.

DVB-T2 [2] is a second generation standard for digital video broadcasting of terrestrial TV. The main requirement addressed by this new standard is to provide higher capacity than the first generation DVB-T standard [1]. It is envisaged that this increased capacity can be used for HDTV broadcasting.

DVB-T2 is a guard interval OFDM system with some differences when compared with DVB-T. Space-frequency coding is used to provide transmitter diversity (so called MISO—multiple input, single output) in T2. The space-frequency code is a modified Alamouti code applied to adjacent sub-carriers in each OFDM symbol.

Figure 1:
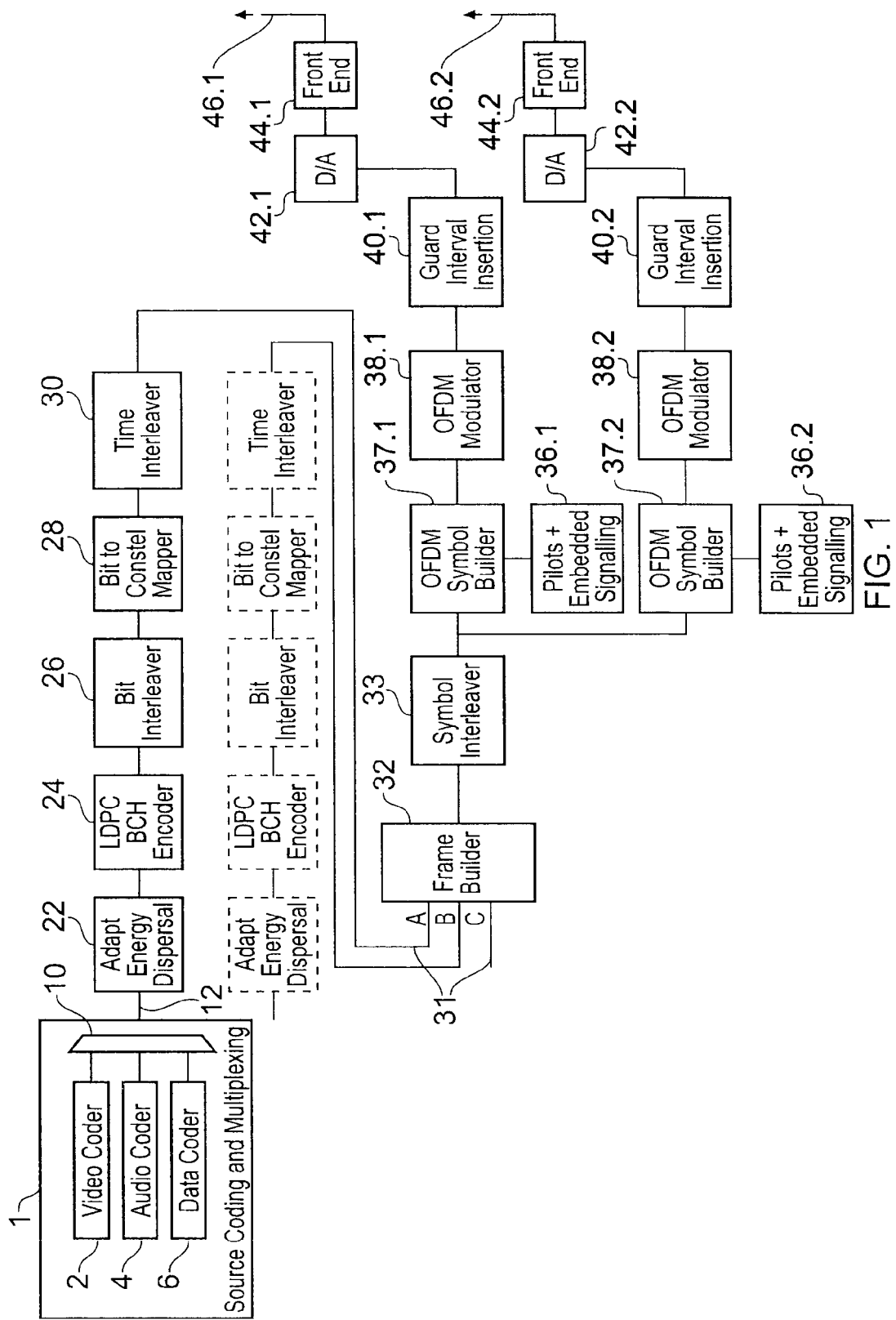
FIG. 1 is a schematic block diagram of a DVB T2 transmitter chain which includes elements which are repeated in order to transmit OFDM symbols in accordance with a MISO/Alamouti encoding scheme.

FIG. 1 provides an example block diagram of an OFDM transmitter which may be used for example to transmit video images and audio signals in accordance with the DVB-T, DVB-H, DVB-T2 or DVB-C2 standard. In FIG. 1 a program source generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 an OFDM transmitter 20 receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B etc in FIG. 1, via other channels 31. The frame builder 32 then forms many data cells into sequences to be conveyed on OFDM symbols, where an OFDM symbol comprises a number of data cells, each data cell being mapped onto one of the sub-carriers. The number of sub-carriers will depend on the mode of operation of the system, which may include one of 1 k, 2 k, 4 k, 8 k, 16 k or 32 k, each of which provides a different number of sub-carriers according, for example to the following table:

| Mode | Data Sub-carriers |
|---|---|
| 1K | 853 |
| 2K | 1705 |
| 4K | 3409 |
| 8K | 6913 |
| 16K | 13921 |
| 32K | 27841 |

Maximum Number of Sub-carriers per mode.

If MISO transmission is to be utilised, then the sequence of data cells to be carried in each OFDM symbol is communicated in parallel to two duplicated versions of a remaining part of a transmitter chain.

The transmitter shown in FIG. 1 has been adapted to provide MISO mode transmission. In the MISO mode, two versions of the OFDM symbols are generated. As a result in the transmitter, after the symbol interleaver 33, certain elements are repeated. For example, as shown in FIG. 1 an OFDM symbol builder 37.1, a pilot and signalling data embedder 36.1, an OFDM modulator 38.1, a guard interval inserter 40.1, a digital to analogue converter 42.1 and a front end RF unit 44.1, as well as a transmitter antenna 46.1 are provided in a first branch, and an OFDM symbol builder 37.2, a pilot and signalling embedder 36.2 as well as an OFDM modulator 38.2, a guard interval inserter 40.2, a digital to analogue converter 42.2 an RF front end 42.2, and a second transmitter antenna 46.2 are provided in a second branch.

The duplicated elements of the transmitter shown in FIG. 1 are arranged to form an Alamouti encoding system in accordance with a multiple input multiple output or multiple input multiple single output mode with which the present technique finds application.

Figure 2:
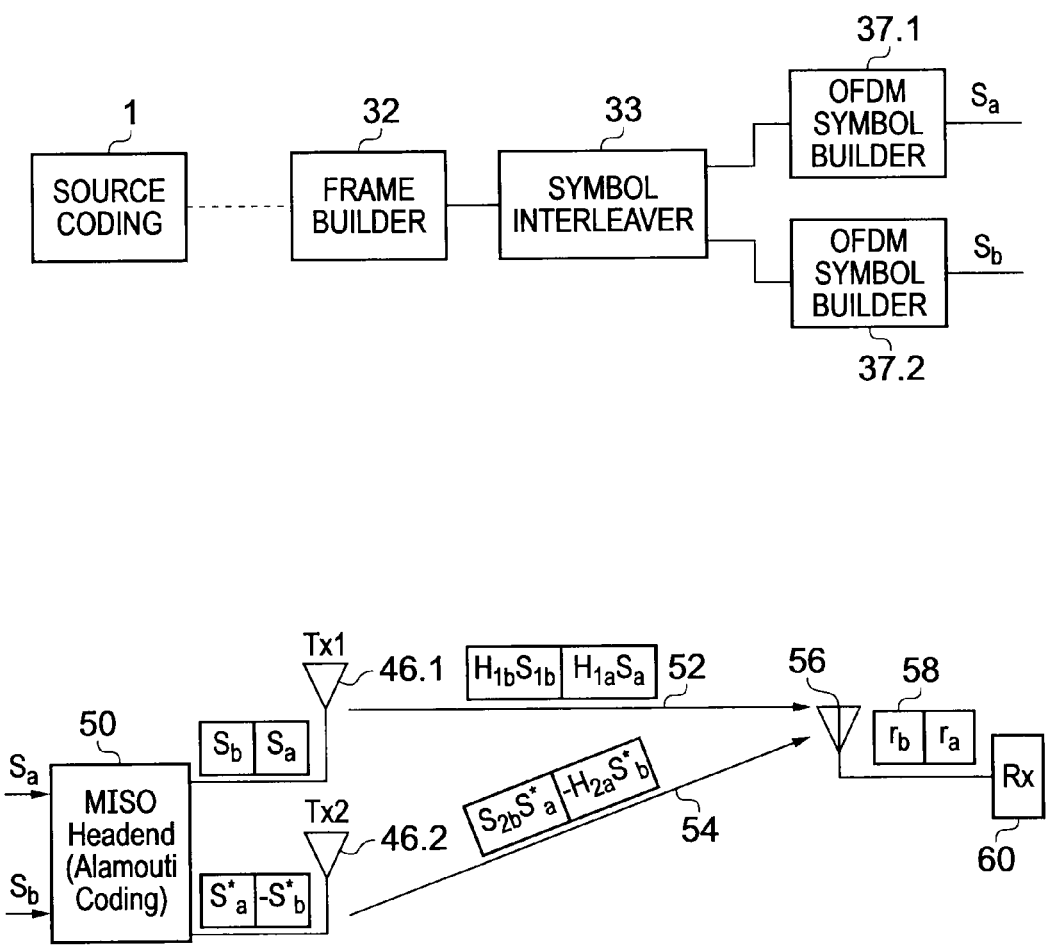
FIG. 2 is a schematic representation of a simplified version of the transmitter shown in FIG. 1 to illustrate Alamouti encoding.

FIG. 2 provides a simplified representation of the elements shown in FIG. 1 which is used to explain Alamouti encoding in accordance with the DVB-T2 MISO mode. As shown in FIG. 2 a simplified version of the transmitter chain includes a source coding unit 1, which forms OFDM symbols using a frame builder 32 and a symbol interleaver 33. The OFDM symbol builder 37.1, 37.2 form first and second symbols Sa, Sb which form a pair within each of the respective versions of the OFDM symbol in accordance with the Alamouti encoding. Each of the symbol pairs Sa, Sb form an Alamouti cell which are transmitted in a different order via each of the respective transmitter antennas 46.1, 46.2. Thus the MISO head end unit 50 enables a formation of the respective pairs of data symbols into a form in which they can be Alamouti encoded. Each of the pairs of data symbols $S_a$ $S_b$ are then transmitted via different paths 52, 54 before being received by a single receive antenna 56. Respective versions of the received symbol pair $r_a$ $r_b$ are then processed by a receiver 60.

Accordingly, the Alamouti coding of pairs of data symbols does not change the value or order of transmission of the data symbols transmitted on the first transmitter antenna 46.1 but does change the transmitted symbol values and their order for the cells transmitted on the second transmitter antenna 46.2. Thus from the first transmitter antenna 46.1 $S_a$ is transmitted first followed by $S_b$ i.e. the cells maintain their value and their order while for the second transmitter antenna 46.2, the order and value of $S_a$ and $S_b$ are modified. Specifically, for the second transmitter antenna 46.2 the first value to be transmitted is $(-S_b^*)$ followed by $(S_a^*)$. Therefore in the first bin of the associated pair the first transmitter antenna 46.1 transmits $S_a$ while the second transmitter antenna 46.2 transmits $(-S_b^*)$. Then in the second bin of the pair, the fist transmitter antenna 46.1 transmits $S_b$ while the second transmitter antenna 46.2 transmits $(S_a^*)$; where * denotes the complex conjugation operation.

Frame Format

Figure 3:
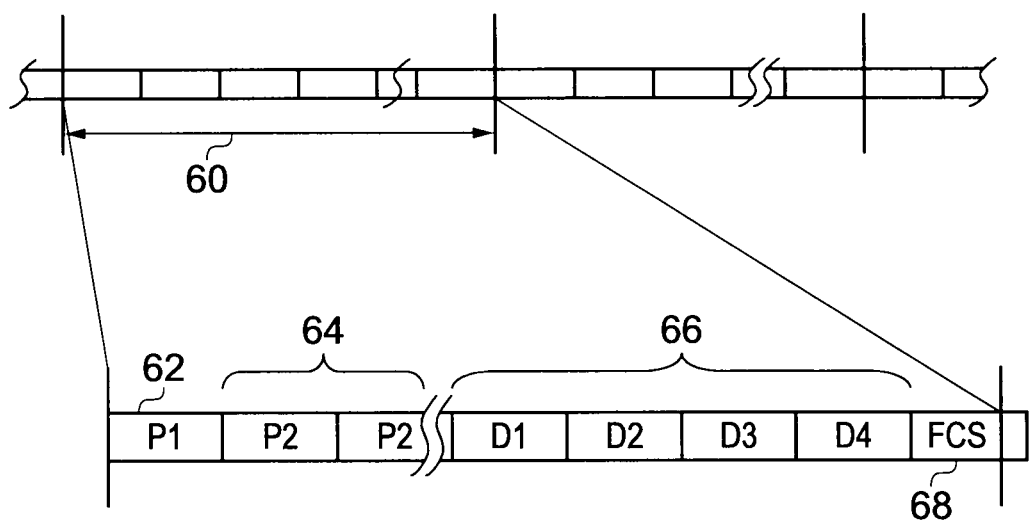
FIG. 3 is a schematic block diagram illustrating a frame of OFDM symbols in accordance with the DVB T2 standard.

For the DVB-T2 system, the number of sub-carriers per OFDM symbol can vary depending upon the number of pilot and other reserved carriers. An example illustration of a "super frame" according to the DVB-T2 standard is shown in FIG. 3.

Thus, in DVB-T2, unlike in DVB-T, the number of sub-carriers for carrying data is not fixed. Broadcasters can select one of the operating modes from 1 k, 2 k, 4 k, 8 k, 16 k, 32 k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with a preamble or P1 symbol as shown in FIG. 2, which provides signalling information relating to the configuration of the DVB-T2 deployment, including an indication of the mode. The P1 symbol is followed by one or more P2 OFDM symbols 64, which are then followed by a number of payload carrying OFDM symbols 66. The end of the physical layer frame is marked by a frame closing symbols (FCS) 68. For each operating mode, the number of sub-carriers may be different for each type of symbol. Furthermore, the number of sub-carriers may vary for each according to whether bandwidth extension is selected, whether tone reservation is enabled and according to which pilot sub-carrier pattern has been selected. As such a generalisation to a specific number of sub-carriers per OFDM symbol is difficult.

Receiver

Figure 4:
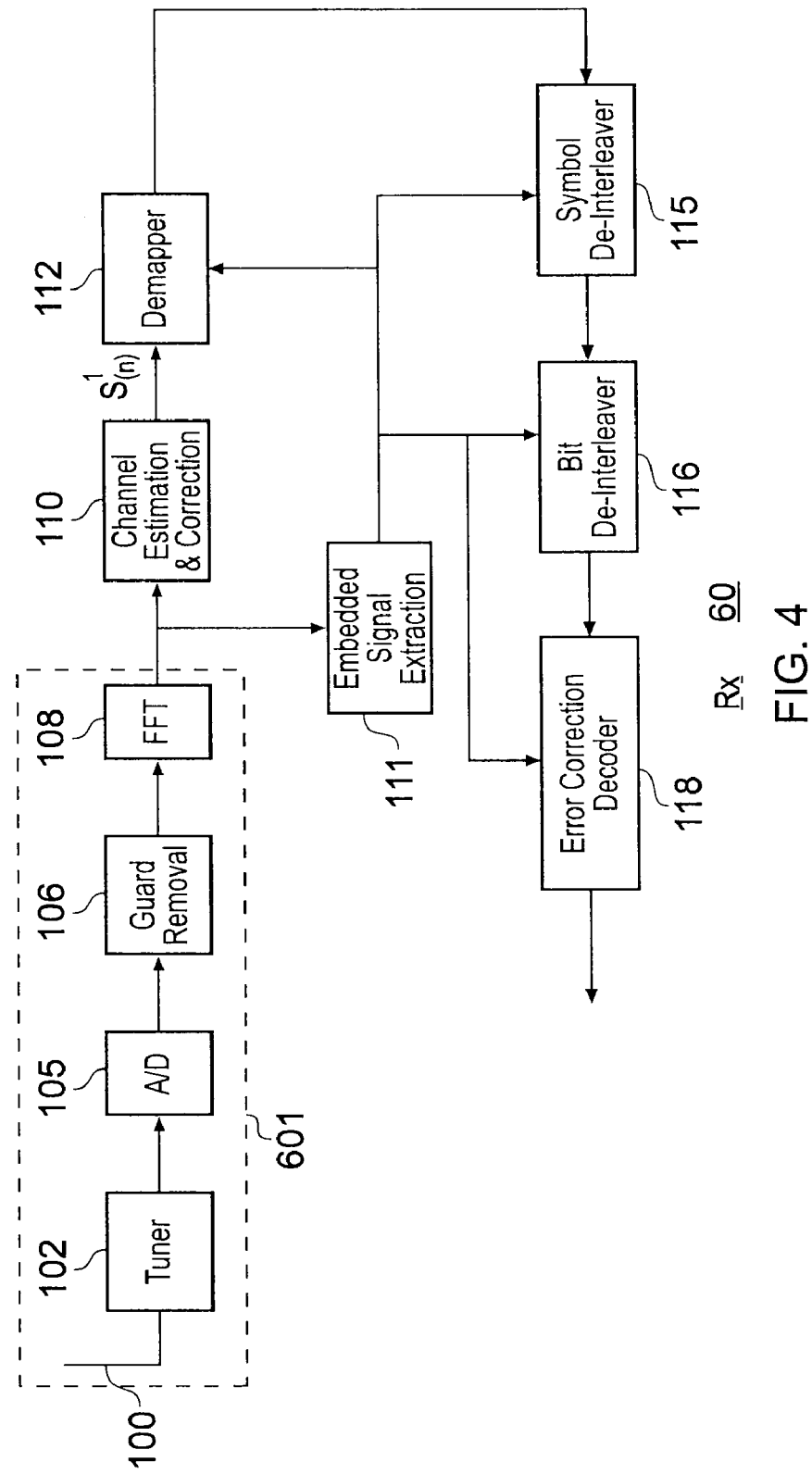
FIG. 4 is a schematic block diagram of a receiver which is arranged to detect and recover data from OFDM symbols received from the transmitter shown in FIG. 1 which have been Alamouti encoded.

FIG. 4 provides a more detailed example illustration of the receiver 60 which may be used with the present technique. As shown in FIG. 4, an OFDM signal is received by an antenna 100 and detected by a tuner 102 and converted into digital form by an analogue-to-digital converter 104. A guard interval removal processor 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to a symbol de-interleaver 114, which operates to effect a reverse mapping of the received data symbol to re-generate an output data stream with the data de-interleaved. Similarly, the bit de-interleaver 116 reverses the bit interleaving performed by the bit interleaver 26. The remaining parts of the OFDM receiver shown in FIG. 4 are provided to effect error correction decoding 118 to correct errors and recover an estimate of the source data.

Alamouti Decoding Theory

As explained above, MISO is a kind of transmitter diversity included in T2 by which each QAM data-carrying cell is transmitted from two transmit antennas for reception through one antenna. Prior to transmission, a relationship (the so-called space-frequency coding) is created between pairs of QAM cells using a modified Alamouti encoding [3]. In DVB-T2, the paired cells to be transmitted from the two antennas—hence the space (differentially located transmit antennas) are from the same OFDM symbol but assigned to two adjacent sub-carriers—hence the frequency (different OFDM sub-carriers) coding. As shown in FIG. 2, at the output of the receiver front end 601, the received cells as illustrated occur in the order $r_a$ and $r_b$ and can be designated as:

$$r_a = H_{1a}S_a - H_{2a}S_b^* + n_a \quad (1)$$

$$r_b = H_{1b}S_b + H_{2b}S_a^* + n_b \quad (2)$$

where $H_{1a,b}$ and $H_{2a,b}$ are the channel transfer function (CTF) coefficients representing the first and second propagation paths 52, 54 shown in FIG. 2. The subscripts a and b relate to the CTF coefficients during reception of $r_a$ and $r_b$ respectively. Thus $H_{2b}$ for example is the CTF coefficient from the second transmitter antenna 46.2 to the receiver antenna 56 during reception of $r_b$. The terms $n_a$ and $n_b$ characterise the receiver noise terms during reception of $r_a$ and $r_b$ respectively. Define:

$$H = \begin{pmatrix} H_{1a} & -H_{2a} \\ H_{2b}^* & H_{1b}^* \end{pmatrix}, S = \begin{pmatrix} S_a \\ S_b^* \end{pmatrix}, n = \begin{pmatrix} n_a \\ n_b^* \end{pmatrix}, r = \begin{pmatrix} r_a \\ r_b^* \end{pmatrix} \quad (3)$$

Then in matrix notation, $$r = HS + n \quad (4)$$

With knowledge of $H_{1a,b}$ and $H_{2a,b}$, estimates of the transmitted cells $\hat{S} = (\hat{S}_a, \hat{S}_b^*)^T$ can be derived from:

$$\hat{S} = H^{-1}r = \frac{1}{\rho}\begin{pmatrix} H_{1b}^* & H_{2a} \\ -H_{2b}^* & H_{1a} \end{pmatrix}\begin{pmatrix} r_a \\ r_b^* \end{pmatrix} \quad (5)$$

where $\rho = (H_{1a}H_{1b}^* + H_{2a}H_{2b}^*)$. Expanding Equation (5) and substituting for $r_a$ and $r_b$ from Equations (1) and (2):

$$\hat{S}_a = \rho^{-1}(H_{1b}^* r_a + H_{2a} r_b^*) = S_a + \rho^{-1}(H_{1b}^* n_a + H_{2a} n_b^*) \quad (6)$$

$$\hat{S}_b^* = \rho^{-1}(H_{1a} r_b^* - H_{2b}^* r_a) = S_b^* + \rho^{-1}(H_{1a} n_b^* - H_{2b}^* n_a) \quad (7)$$

Note that the scaling $\rho^{-1}$ is complex. From Equations (6) and (7) the demodulated values can be derived by use of the classic Alamouti approach wherein it is assumed that from each transmitter antenna, the channel coefficient stays the same during reception of the paired cells—i.e. $H_1 = H_{1a} = H_{1b}$ and similarly, $H_2 = H_{2a} = H_{2b}$. This makes $\rho = (H_1 H_1^* + H_2 H_2^*)$ real—thereby avoiding complex division. This approach however suffers additional loss if the channel from a given transmitter actually varies even slightly in phase and/or amplitude between reception of $r_a$ and $r_b$. However, it has the advantage of lower complexity in the calculation and use of $\rho$.

MISO Mode Channel Estimation

As will be appreciated in order to perform Alamouti decoding an estimate of the channel for both diversity branches is required. In the receiver shown in FIG. 4, these operations are performed by the channel estimator and corrector 110.

In channel estimation the CTF coefficients $H_{1a,b}$ and $H_{2a,b}$ have to be estimated using scattered pilots (SPs) embedded in each OFDM symbol. When MISO is in use in DVB-T2 transmission, the SPs for one of the two transmitter chains are modified. This modification is done as follows: for the first transmitter antenna 46.1, SPs are transmitted as normal whilst for the second transmitter antenna 46.2 every other SP is inverted. At the receiver antenna 56 pilot cells from the two transmitter antennas combine forming either 'sum pilots' (when un-inverted pilots are transmitted from both antennas 46.1 46.2) or 'difference pilots' (when the first transmitter antenna 46.1 transmits an un-inverted pilot whilst the second transmitter 46.2 transmits an inverted pilot). This is illustrated for the PP1 pilot pattern in FIG. 5a FIG. 5a provides a schematic representation illustrating the formation of the pilot symbols for an example pilot pattern. The dark pilot cells 150 represent 'sum pilots' whilst the light cells 152 represent 'difference pilots'. As explained above, the pilot data symbol on some of the scattered pilots of the DVB-T2 standard for the second version of the OFDM symbol transmitted by the second lower branch are inverted with respect to the corresponding pilot symbol on the first upper branch. Accordingly, when these symbols are received contemporaneously at the receive antenna 56, they will form different scattered pilots. On the other hand, some of the scattered pilots in the second version of the OFDM symbol will not be inverted, that is to say they will be in phase with the version of the pilots on the first version of the OFDM symbol transmitted by the upper transmit antennas. Thus, as shown in FIG. 5a so called sum pilots are shown as the dark pilot cells 150 whereas different pilots are shown as the light shaded cells 152 whereas data cells are shown as white blocks.

In some receivers, channel estimates for symbols transmitted in the MISO mode can be can be derived as follows. Firstly, the received value at each pilot cell is divided by the relevant known value from the pilot modulating PN sequence to get an estimate of the CTF. Let scattered pilot cell 2n be a sum pilot and let SP cell 2n+1 be difference pilot. Then, at the receiver if it is assumed that the channel coefficients $H_1$ and $H_2$ from the first transmitter 46.1 and the second transmitter 46.2 respectively to the receiver are constant for the neighbouring SP cells 2n and 2n+1 (this assumption is only a convenience of derivation—in practice, after frequency interpolation, the CTF at the neighbouring cells will be different as necessary), and that p is the SP scaling, then the received pilot cells r are:

$$r_{2n} = H_1 p_{2n} + H_2 p_{2n} + e_{2n} \quad (8a)$$

$$r_{2n+1} = H_1 p_{2n+1} - H_2 p_{2n+1} + e_{2n+1} \quad (9a)$$

where $e_{2n}$ and $e_{2n+1}$ are noise terms during reception of the pilot cells. Demodulate the pilot cells by dividing $r_{2n}$ and $r_{2n+1}$ by $p_{2n}$ and $p_{2n+1}$ respectively to get $g_s$ and $g_d$—the sum and difference CTF respectively:

$$g_s = H_1 + H_2 + e_{2n}/p_{2n} \quad (8b)$$

$$g_d = H_1 - H_2 + e_{2n+1}/p_{2n+1} \quad (9b)$$

Then ignoring the noise terms, the two resulting equations in two unknowns can be solved to get $H_1$ and $H_2$. More generally, the solution can be found by executing:

$$\binom{H_1}{H_2} = \begin{pmatrix} 1 & 1 \\ 1 & -1 \end{pmatrix}^{-1} \binom{g_s}{g_d} \quad (10)$$

We need to invert the Hadamard matrix in Equation (10). Note that for any Hadamard matrix D, $D^T D = mI$ where m is the rank order of the matrix (=2 in this case). Thus for Hadamard matrices, $D^{-1} = (1/m) D^T$ and inversion is rather trivial giving the solutions:

$$H_1 = \frac{g_s + g_d}{2}, \quad H_2 = \frac{g_s - g_d}{2} \quad (11)$$

The execution of Equation (11) is known as sum-difference decoding.

Temporal and Frequency Interpolation MISO Mode Channel Estimation

The CTF coefficients $g_s$ and $g_d$ or indeed $H_1$ and $H_2$ only exist in a grid defined by the occurrence of the scattered pilots (SP) that are embedded into the signal for use in channel estimation. There are eight different scattered pilot (SP) patterns in DVB-T2. The choice of SP pattern is closely linked to the FFT mode and guard interval being used. This is because small guard intervals for example are chosen by operators whose network topology presents very short delay spreads. For such delay spreads, optimum channel estimation can still be achieved by widely spaced scattered pilots in frequency. Table 1 shows the spacing of the pilot patterns where $D_x$ is the frequency spacing between two SP sub-carriers and Dy is the repetition interval of SP cells on a give sub-carrier.

TABLE 1

| Scattered pilot patterns | | | |
|---|---|---|---|
| Pilot pattern | Dx | Dy | Cascade Up-sample factors |
| PP1 | 3 | 4 | {2, 3} |
| PP2 | 6 | 2 | {2, 2, 3} |
| PP3 | 6 | 4 | {2, 2, 3} |
| PP4 | 12 | 2 | {2, 2, 2, 3} |
| PP5 | 12 | 4 | {2, 2, 2, 3} |
| PP6 | 24 | 2 | {2, 2, 2, 2, 3} |
| PP7 | 24 | 4 | {2, 2, 2, 2, 3} |
| PP8 | 6 | 16 | {2, 2, 3} |

To equalise the whole OFDM symbol, CTF coefficients must be determined for all data bearing sub-carriers in the symbol. This can be done by first interpolating the CTF coefficients in the time direction (temporal interpolation) followed by interpolation in the frequency direction (frequency interpolation). FIG. 5b shows the outcome of temporal interpolation on $g_s$ and $g_d$. on the PP1 pattern of FIG. 5a. Notice that a CTF coefficient now occurs every Dx=3 sub-carriers.

As shown in FIG. 5b, the sum and difference CTF coefficients resulting from the temporal interpolation (TITP) must in turn undergo frequency interpolation (FITP) separately to provide two versions of the grid of FIG. 5b—one in which all cells are filled completely with difference coefficients $g_d$ and another in which all cells are filled with sum coefficients $g_s$. The two grids provide the CTF coefficients for use in Alamouti decoding. The consequence of assuming that the channel coefficient is the same for each transmitter over SP cells 2n and 2n+1 is that the minimum coherence bandwidth of any channel that can be accurately estimated using the SP pattern is now wider than it would otherwise be if the same SP pattern was used in the SISO case. Indeed, for this particular case the minimum coherence bandwidth is doubled. The effect of this is to halve the effective pilot density $D_x$ in the frequency dimension and consequently halve the maximum channel delay spread that a MISO receiver (with the given SP pattern) can cope with.

Figure 6:
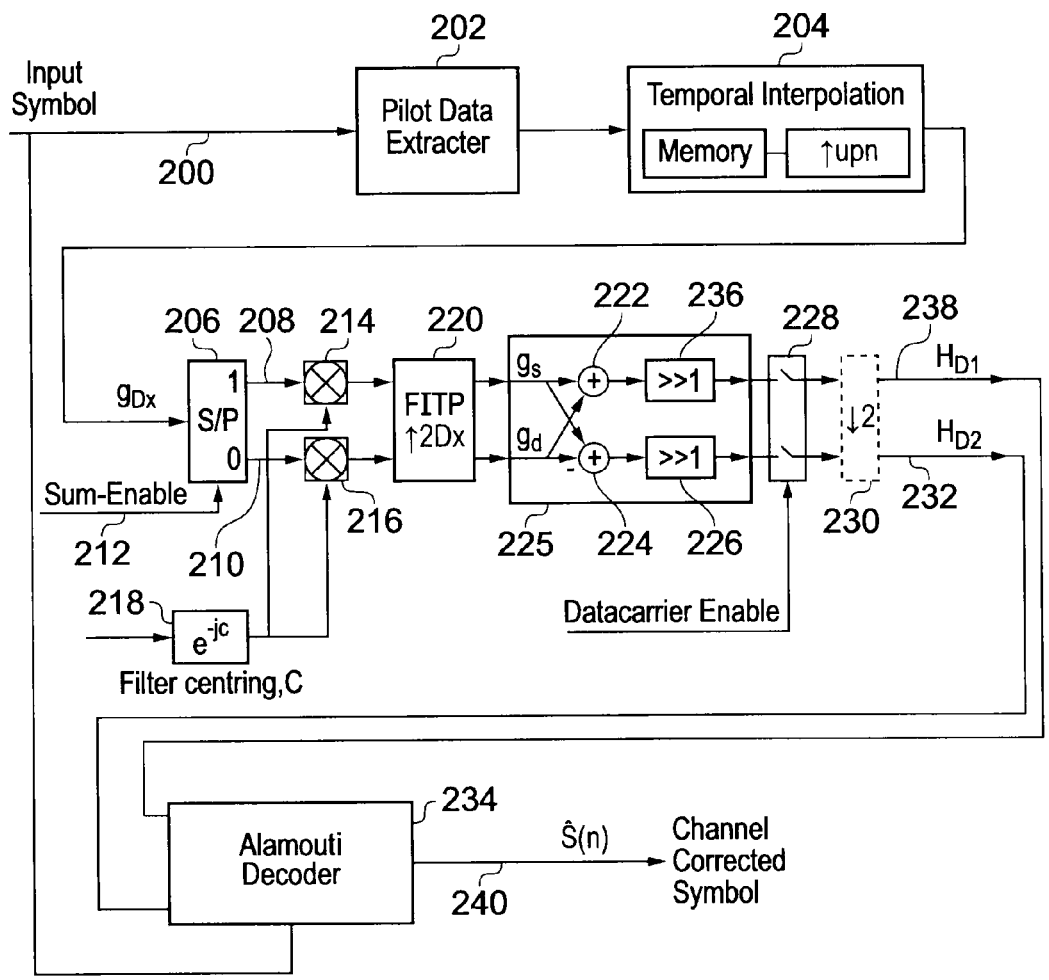
FIG. 6 is a schematic block diagram of a channel estimator and corrector which is shown in FIG. 4 and includes an Alamouti decoder.

Implementation of Temporal and Frequency Interpolation MISO Mode Channel Estimation FIG. 6 provides a schematic diagram of an example channel estimator and interpolator 110.1 arranged to implement the Temporal and Frequency Interpolation MISO Mode Channel Estimation discussed above. In FIG. 6, the OFDM symbols are received on an input channel 200 and received at a pilot data extracting unit 202. The pilots' are then fed to a temporal interpolation unit 204. As explained above when performing temporal interpolation if a number of OFDM symbols can be stored then up-sampling can be performed by interpolating between the stored pilot symbols to form a sum pilot carrier value $g_s$ and a difference pilot carrier value $g_d$ at each location where those scattered pilots are positioned within the OFDM symbols such as that shown in FIG. 5b. The pilot carrier values are then fed to a serial to parallel converter 206, which separates the sum pilot carrier values $g_s$ and the difference pilot carrier values $g_d$ 206 into two parallel streams 208 to 210. The sum enable signal 212 provides an indication as to whether pilot carrier values are sum or difference. Each of the parallel sum and difference pilot values are then fed to a multiplier 214, 216 which receives a phase offset from a phase offset generator 218, which has an effect of centring the respective carrier values within a bandwidth of the frequency interpolation filter (FITP). Each of the sum and difference pilot carrier values are then received by a frequency interpolator 220 which perform frequency interpolation to generate a value of the sum and difference pilot carrier values at each location of a data cell throughout the OFDM symbol. The sum pilot carrier values $g_s$ are then fed to an adder 222 and the difference pilot of carrier values are then fed to a second adder 224 but which are subtracted from the sum pilot carrier values received on a opposite branch to form after the scaling unit 226 and data carrier enabler 228 and a down sampler 230, a sample of the channel impulse response for that data symbol of a pair of data symbols encoded in accordance with the Alamouti encoding. Thus the value of the CTF response is fed via a connection channel 232 to an input of an Alamouti decoder 234. Correspondingly, on the upper branch providing sum carriers $g_s$, the first adder 222 receives from an opposite branch a value of a difference pilot $g_d$ which is added by the summer 222 and after scaling via unit 236 passing through the data enable circuit 228 and the down-converting unit 230 forms a corresponding sample for the channel impulse response for the first symbol of the pair on an output channel 238. The pair of samples of the channel transfer function coefficient (CTF) are received by the Alamouti decoder which performs an Alamouti decoding operation as explained in the following section to form on an output channel 240 an estimate of the symbols $S_a$, $S_b$ as were transmitted by the transmitter in each of the different conversions corresponding to the Alamouti encoding.

As can be seen from FIG. 6, after the time-dimension interpolation by the temporal interpolation unit 204, the sum-difference channel estimates are designated as gDx since they occur with Dx sub-carrier spacing. Furthermore, frequency interpolation by the frequency interpolator 220 is done separately on the sum sequence gs and the difference sequence $g_d$. Whilst gDx is sampled every Dx cells, the sum and difference sequences $g_s$ and $g_d$ are each sampled every 2Dx cells. The frequency interpolator 220 (undertaken after centring the channel impulse response under the interpolation filter window) therefore has to interpolate by a factor of 2Dx. This provides values of $g_s$ and $g_d$ every cell of the OFDM symbol. Corresponding pairs of elements of $g_s$ and $g_d$ then go through the sum-difference decoding of Equation (11) to provide H1 and H2 for every cell of the OFDM. The last decimation by 2 by the down-converting unit 230 would be used if classic Alamouti decoding is used. The outputs are the sequences $H_{D1}$ and $H_{D2}$ formed from $H_1$ and $H_2$ by taking only the coefficients from data-bearing cells. These outputs would be used in the Alamouti decoding.

As will be appreciated from the above explanation each of $g_s$ and $g_d$ includes the CTF from both transmitters—Equations (8b) and (9b). A combined centring delay spread can therefore be used. The actual combined delay spread depends on the form of MISO used. In co-located MISO, since both transmit antennas are on the same transmitter tower, the difference in time of arrival of the signals at the receiver from the two antennas is therefore minimal. In this scenario, the first paths from both transmitters arrive approximately simultaneously. Therefore the delay spread of the combined channel is the longer of the two delay spreads.

In distributed MISO, the transmit antennas may be located on different transmit towers—for example on separate SFN transmit towers. In this case, it is likely that there is a large difference between the time of arrival of the signals from the two transmitters. In the worst case, the combined delay spread is the sum of the two delay spreads. This uncertainty as to whether it is co-located or distributed MISO should not cause a problem if the filter centring, which generates the phase offset $e^{-jc}$ uses a search algorithm for the optimum delay spread setting.

Alamouti Decoder

As explained above, the pair of samples of the channel impulse response are received by the Alamouti decoder 234 which performs an Alamouti decoding operation. As well as executing traditional channel correction it also reverses the association between the paired cells.

Figure 7:
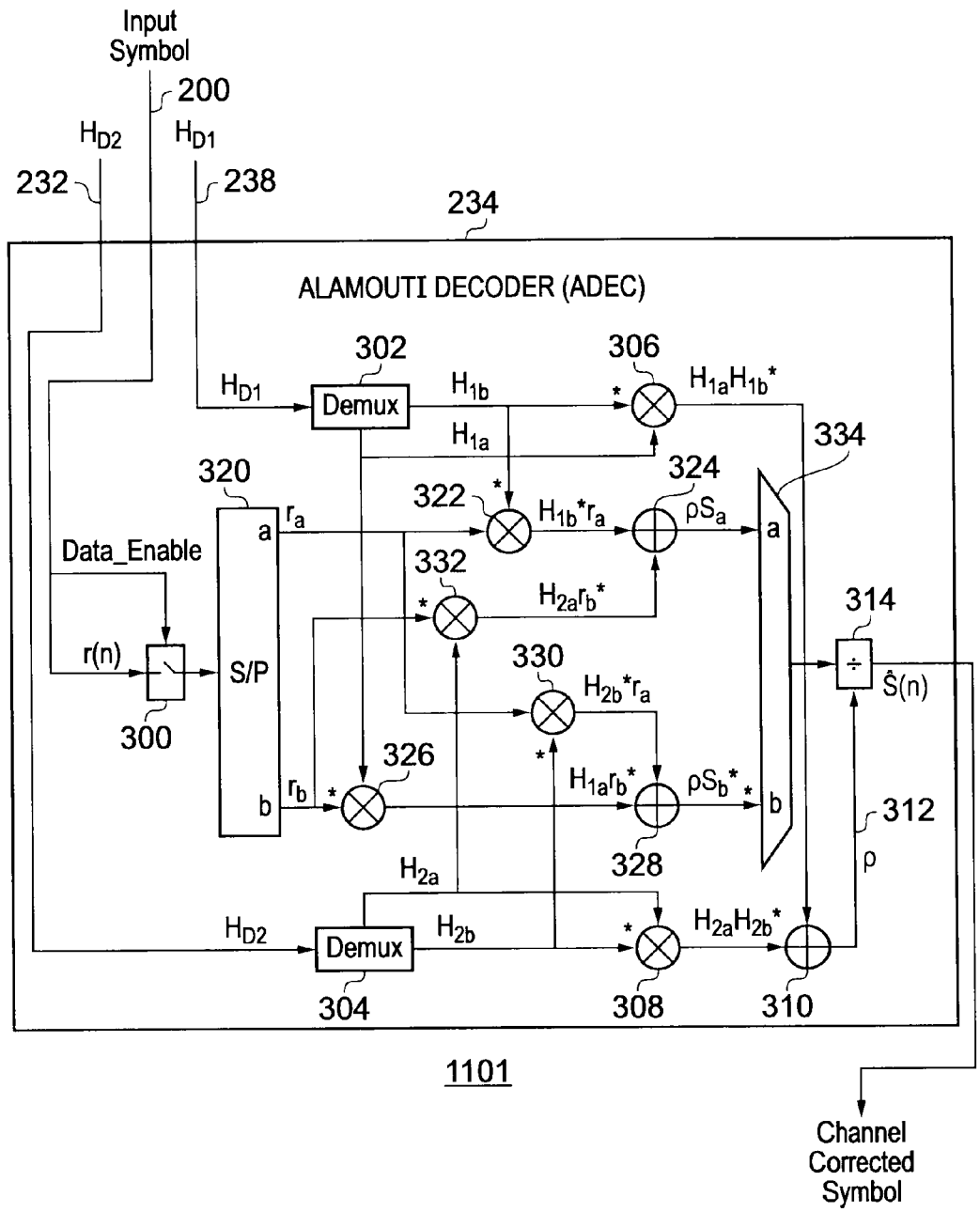
FIG. 7 is a schematic block diagram of an Alamouti decoder which is shown in FIG. 6.

FIG. 7 provides a schematic block diagram of the Alamouti decoder 234 in accordance with the present technique. The input symbols are received via an input channel 200 and fed to a data enable unit 300. Each of the samples of the channel transfer function (CTF) for the respective pair of symbols are received from the channels 238, 232 at the de-multiplexer 302, 304 respectively. The de-multiplexers 232, 234 serve to separate the pairs of channel samples corresponding to the pair of symbols of the paired data cells into respectively $H_{1b}$, $H_{1a}$, $H_{2a}$, $H_{2b}$ which are first fed to a first and second multipliers 306, 308 which are multiplied together with a conjugate being applied to one of the two channel samples $H_{1b}$, $H_{2b}$, and each of the respective first and second multipliers 306, 308 form at the output a multiplication of the two channel samples for the pair $H_{1a}$, $H_{1b}^*$ and $H_{2a}$, $H_{2b}^*$ which are added by a first adder 310 to form on an output channel 312 and intermediate representation of the channel state ρ. The value of ρ on the output channel 312 is received at the first input of a divider circuit 314.

After the received symbols r(n) are passed through the data enabling block 300 they are received by the serial to parallel converter 320 which separates the pairs of symbols into upper and lower branches for processing the first symbol of the pair $r_a$ and the second symbol of the pair $r_b$. The first symbol $r_a$ is fed to a multiplier 322 on a first input which received on a second input a conjugate of the opposite channel sample $H_{1b}^*$ which are multiplied together and fed to a first input of an adder 324. On the opposite branch the channel sample for the opposite symbol channel $H_{1a}$ is fed to a first input of a multiplier 326 which receives at a second input a conjugate of the lower symbol of the pair and forms at an output $H_{1a} r_b^*$ which is fed to a first input of an adder 228. A multiplier 330 receives on a first input a conjugate value from the channel impulse response sample for that symbol for the second version of the transmitted OFDM symbol which is conjugated and multiplied by the multiplier 330 by the received symbol from the upper branch $r_a$ to form a product $H_{2b} r_a^*$ which is subtracted from the output of the multiplier 326 by the adder circuit 328, using a negative applied to the second input, to form at an output a value $\rho S_b^*$ which is an estimate of the second symbol of the pair multiplied by a scaling factor ρ which is dependent on the channel.

A further multiplier 332 receives a conjugated value of the second received symbol $r_b^*$ and is multiplied by a value of the channel impulse response for the first symbol position for the second transmitted OFDM symbol to form at an output which is fed to the adder 324 $H_{2a} r_b^*$. Thus at the output of the upper adder 324 a value of $\rho S_a$ is formed which is an estimate of the first symbol ($S_a$) of the pair multiplied by the factor ρ. A parallel to serial convertor 334 is used to feed the estimates of the symbols multiplied by the factor ρ to the divider unit 314 which divides the value by the value of ρ fed from the adder 310 to form at an output an estimate of the received symbols $S_a$, $S_b$.

The operation of the Alamouti decoder shown in FIG. 7 is explained as follows: The output sequences from $H_{D1}$ and $H_{D2}$ first need to be de-multiplexed into the sequences $H_{1a,b}$ and $H_{2a,b}$ respectively explained as follows in order to execute the decoding Equations (6) and (7). In T2 MISO pairing is between neighbouring data cells, so recalling that $H_{D1}$ and $H_{D2}$ are sequences that hold only the data cell CTF coefficients, this de-multiplexing can be described as follows:

$$H_{1a}=H_{D1}[0,2,4,\ldots]; \quad H_{1b}=H_{D1}[1,3,5,\ldots];$$

$$H_{2a}=H_{D2}[0,2,4,\ldots]; \quad H_{2b}=H_{D2}[1,3,5,\ldots];$$

In other words all even CTF coefficients form $H_{(12)a}$ while all odd CTF coefficients form $H_{(12)b}$. If the classic Alamouti combining approach were used (i.e. include the last decimation by 2, then take either $H_{1a}$ or $H_{1b}$ above for $H_1$ and either $H_{2a}$ or $H_{2b}$ for $H_2$. If however, the variable channel combining approach is used, then the modified Alamouti decoding can be implemented as illustrated in FIG. 7. Notice the de-multiplexers of $H_{D1}$ into $H_{1a}$ and $H_{1b}$ and of $H_{D2}$ into $H_{2a}$ and $H_{2b}$. The rest of FIG. 7 illustrates the implementation of Equations (6) and (7). It is also assumed here that either the received data cells r(n) have been phase shifted by the filter centring rotator or that the CTF coefficients $H_{D1}$ and $H_{D2}$ have been de-rotated to remove the filter centring rotation that they encountered at the input of the frequency interpolation. A possible way to avoid these multiple rotations is to filter-centre the full symbol immediately after the FFT. This not only takes care of the filter centring rotation of the CTF but also the subsequent de-rotation of $H_{D1}$ and $H_{D2}$ or the filter centring rotation of the data cells.

Figure 8:
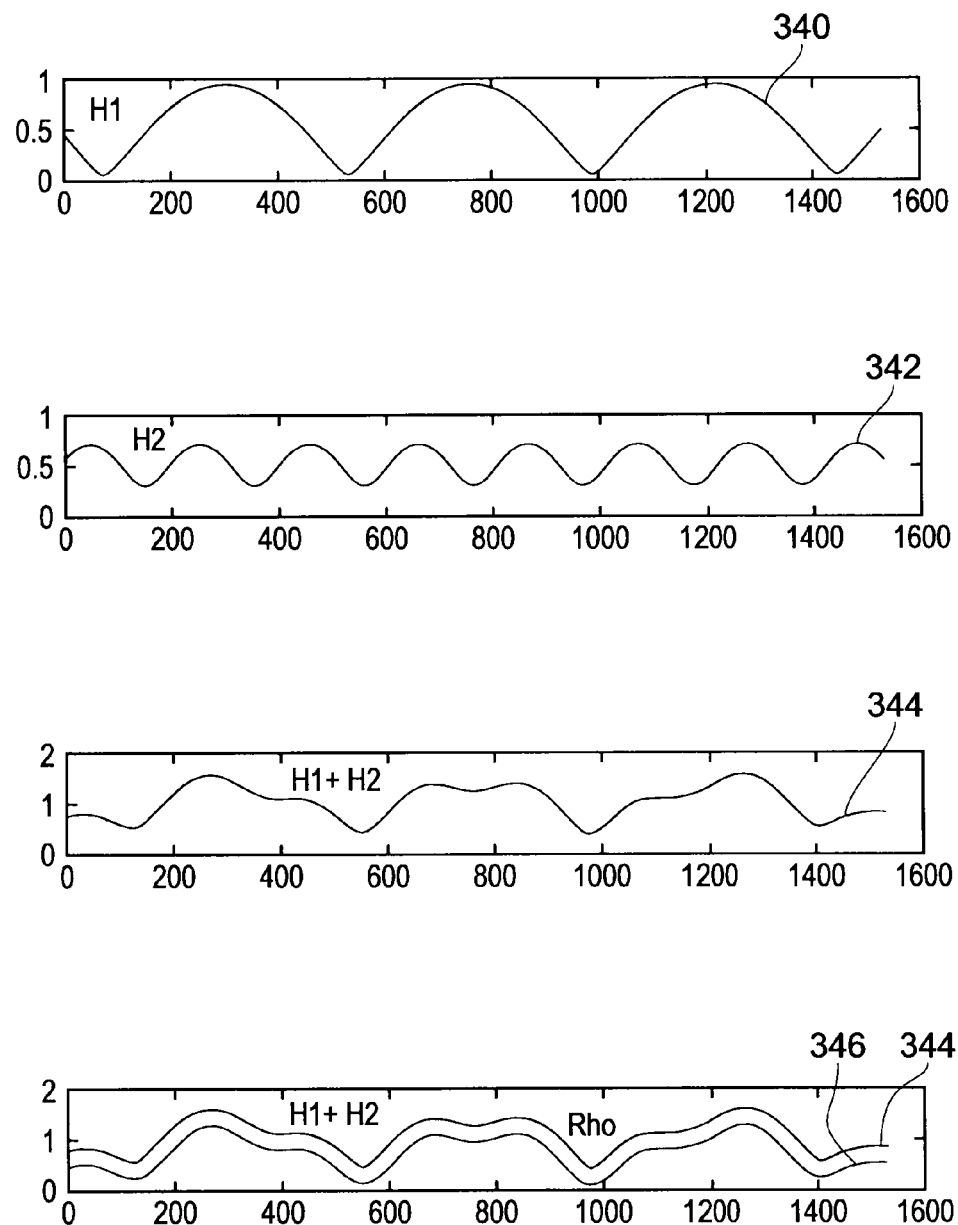
FIG. 8 is a graphical illustration of four plots of signal value with respect to frequency for example signals generated when performing Alamouti decoding.

The computation of $\rho=(H_{1a}H_{1b}{}^*+H_{2a}H_{2b}{}^*)$ is also illustrated. The value of $|\rho|^2$ is proportional to the power of the received cell in much the same way as the CTF coefficient for a SISO OFDM cell is and so could be used to compute the channel state information (CSI). This proportionality is illustrated in FIG. 8. The top plot 340 shows the CTF $|H_1|$ from Tx1, whilst the next plot 342 is the CTF $|H_2|$ from Tx2. The third plot 344 shows the vector summation $|H_1+H_2|$ between the two channels. In the last plot 346, this vector summation is repeated, whilst the plot for $|\rho|$ is superposed. Apart from a slight difference in level which can be resolved by use of appropriate scaling, there is very close correlation between the two. It is therefore possible to compute the CSI by dividing $|\rho|^2$ with the noise power per data cell. This noise power can be derived as explained later below.

Noise Power Modification by Alamouti Decoder

The Alamouti decoder 234 can additionally be used to provide a noise power estimate.

Equations (6) and (7) are re-arranged and reproduced below as Equations (12) and (13), respectively where $\rho=(H_{1a}H_{1b}{}^*+H_{2a}H_{2b}{}^*)$. In the second part of each equation, the term in bracket on the right represents the noise. Given that $n_a$ and $n_b$ are the noise components at the input of the Alamouti decoder 234, it can be said that at the output of the Alamouti decoder these noise components are modified by the channel coefficients.

$$\hat{S}_a=(H_{1b}^*r_a+H_{2a}r_b^*)=\rho S_a+(H_{1b}^*n_a+H_{2a}n_b^*) \quad (12)$$

$$\hat{S}_b^*=(H_{1a}r_b^*-H_{2b}^*r_a)=\rho S_b^*+(H_{1a}n_b^*-H_{2b}^*n_a) \quad (13)$$

As will be appreciated, the signal power is $|\rho|^2$. What is the (modified) noise power? Taking Equation (12) the noise power $N_a$ can be computed as follows:

$$N_a = E[(H_{1b}^*n_a + H_{2a}n_b^*)*(H_{1b}^*n_a + H_{2a}n_b^*)^*]$$

$$= E[H_{1b}^*H_{1b}n_a^*n_a + H_{1b}^*H_{2a}^*n_an_b + H_{1b}H_{2a}n_a^*n_b^* + H_{2a}^*H_{2a}n_b^*n_b]$$

$$= E[H_{1b}^*H_{1b}|n_a|^2 + H_{2a}^*H_{2a}|n_b|^2]$$

If we make the assumption that $E[|n_a|^2]=E[|n_b|^2]=\sigma^2$ then:

$$N_a=\sigma^2 E[H_{1b}^*H_{1b}+H_{2a}^*H_{2a}]=\sigma^2|\rho| \quad (14)$$

if we consider that $H_{1a}{\sim}=H_{1b}$ and $H_{2a}{\sim}=H_{2b}$ which they are in most cases. The CSI which is computed as the ratio of $|\rho|^2$ and $N_a$ is thus given by:

$$CSI = \frac{|\rho|^2}{\sigma^2|\rho|} = \frac{|\rho|}{\sigma^2} \quad (15)$$

where $\sigma^2$ represents the noise power estimated through other means described in [7] and in section 5.

Frequency Only Interpolation MISO Mode Channel Estimation

The MISO channel estimator (MCE) described above and shown in FIG. 6 requires that temporal interpolation is used prior to the channel estimates being computed. At the output of the temporal interpolation, CTF coefficients $g_{Dx}$ are known for one carrier in every $D_x$. However, some pilot patterns such as PP7 have a large $D_y$ which potentially makes for large memory requirements during temporal interpolation.

Figure 9A:
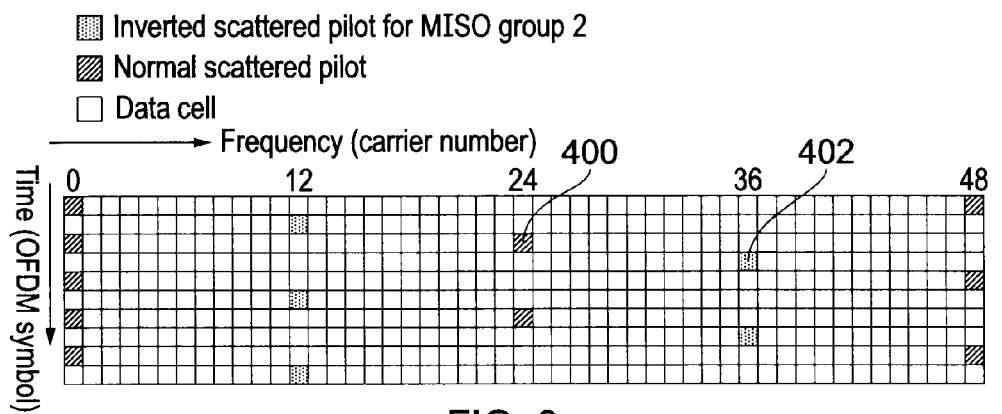
FIG. 9a is a schematic representation of an example OFDM symbol pattern with sum and difference pilots.

Even with SISO, it is envisaged that when such pilot patterns are used, temporal interpolation would not be used. For some of the pilot patterns it has been determined that only frequency-based channel estimation will be used even in SISO. However some pilot patterns typically require temporal interpolation to be performed. However, in the MISO mode this can be avoided in some cases if we devise a more efficient MISO channel estimation mode in which only frequency interpolation is used. FIG. 9a provides a schematic diagram illustrating a PP5 MISO pilot pattern for which $(D_x, D_y)=(12, 4)$.

As explained above, alternate OFDM symbols in the MISO mode carry only either sum or difference pilots and a complete MISO channel estimation process must use both the sum and difference pilots.

Figure 9B:
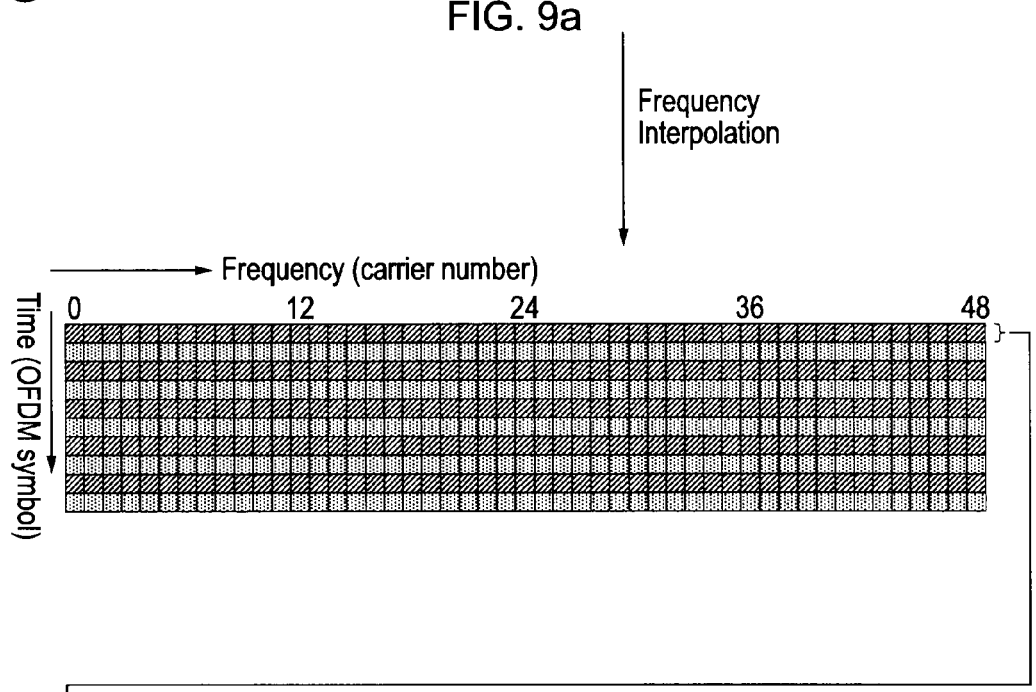

However, for frequency-only channel estimation on a given symbol, we have access either to sum only or difference only pilots but not both. However, assuming that the coherence time of the channel is substantially longer than two symbol periods (this is a reasonable assumption for example roof-top reception), then it follows that the actual channel is relatively constant over more than two symbol periods. If this is the case, then the channel estimates from adjacent symbols can be interchanged without significant distortion. It would therefore be reasonable under these circumstances to combine the sum channel estimates from one symbol with the difference channel estimates from its immediate adjacent neighbour and expect very little degradation. Accordingly, FIG. 9b provides a schematic diagram of an inventive aspect of embodiments of the present invention which illustrates interpolation being performed in the frequency domain across the difference pilots and sum pilots respectively.

Figure 10:
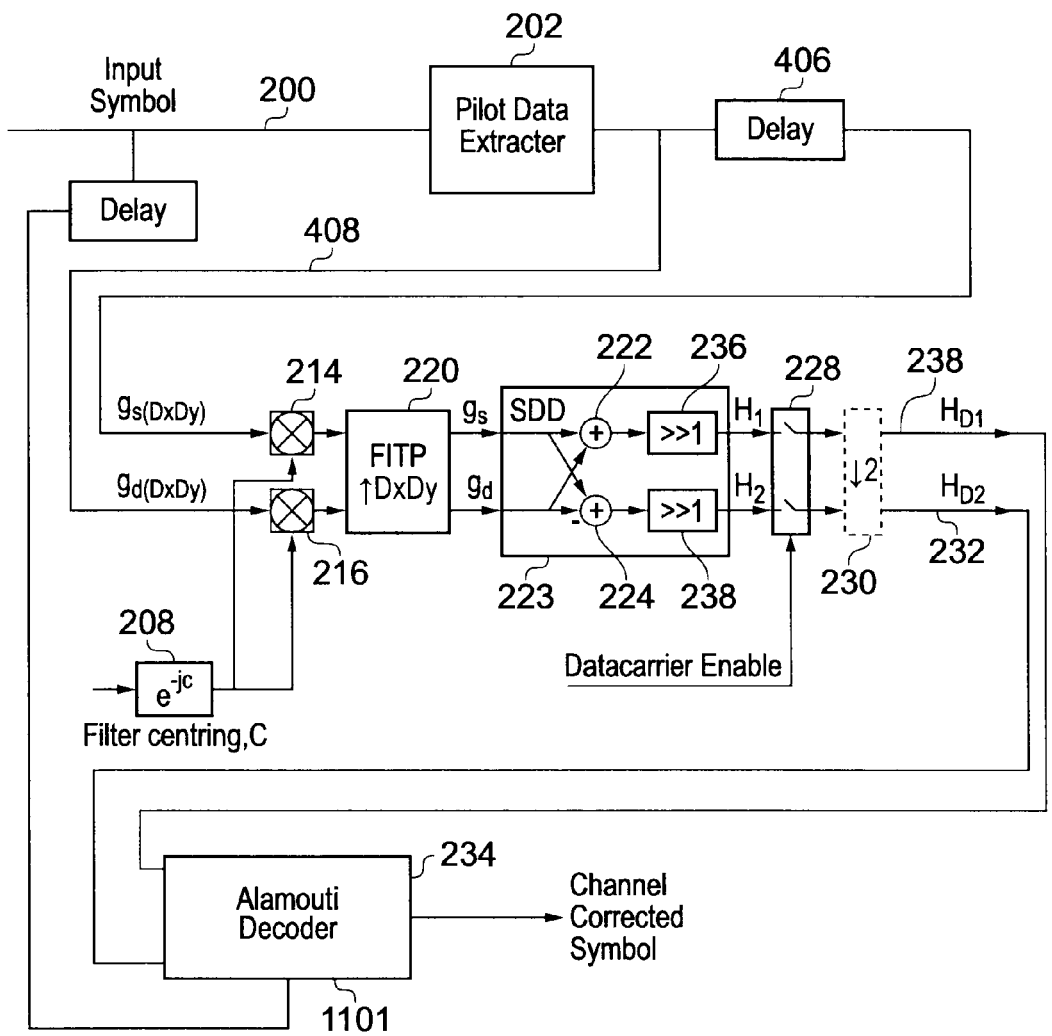
FIG. 10 is a schematic block diagram illustrating one example of the frequency only channel estimation and correction processor.

In these embodiments it is assumed, without generalisation, that even numbered OFDM symbols always carry sum pilots while odd numbered symbols carry difference pilots. Then we can derive our sum channel estimates $g_s$ from symbol $2n$ and derive our difference channel estimates $g_d$ from symbol $2n+1$. Thus after deriving $g_s$ and $g_d$ from Equations (8) and (9) we can apply frequency interpolation by a factor of DxDy to each in turn. This would provide up-sampled versions of each of $g_s$ and $g_d$ with samples for each cell of the OFDM symbol. This is illustrated in FIG. 10, which is similar to FIG. 6 except that $g_s$ and $g_d$ come from adjacent OFDM symbols—not just one symbol as is the case for $g_{Dx}$ in FIG. 6. The (DxDy) subscript on the $g_s$ and $g_d$ inputs is used to indicate the sampling rate of the inputs. The frequency interpolator here uses the same filter cascades that have been described in our co-pending UK patent application number GB0909590.2 for the given SP pattern in frequency-only SISO mode, the contents of which are herein incorporated by reference.

Implementation of Frequency Only Interpolation MISO Mode Channel Estimation

FIG. 10 provides an example frequency only MISO channel estimation and correction processor in accordance with the present technique. Essentially, the channel estimation and correction processor corresponds to the example shown in FIG. 6 except that no temporal interpolation is performed and odd or even OFDM symbols are stored in a delay element 406, so that by interpolating across the frequency domain sum and difference components required for the Alamouti decoding can be made available for each of the data cells within the OFDM symbols. As shown in FIG. 10 the MISO channel estimator and corrector includes a delay element 300, 406 which receives the pilot data extracted from a pilot data extractor 202 and stores the pilot data samples for a first OFDM symbol of the pair, which is then combined with a second OFDM symbol of the pair which is not delayed. The pilot data of the second OFDM symbol of the pair is fed via a channel 408 without going through the delay element 406, which then can be combined with the pilot carriers which have been delayed from the first OFDM symbol in order to generate the samples of the channel for the respective pairs of symbols for respective transmission paths in accordance with the Alamouti encoding decoding. For brevity only the differences between FIG. 6 and FIG. 10 will be explained.

In general the first data symbol can be regarded as even numbered OFDM symbol and the second data symbol can be regarded as odd numbered OFDM symbols carrying difference pilots. As shown in FIG. 10 because the delay element 406 stores the sum pilot values from the first OFDM symbol, there is no requirement for a corresponding serial to parallel converter to form the first and second branches of the channel estimation processor. Again phase offset value $e^{-jc}$ is formed by a phase generator 208 and fed to respective multipliers 214, 216. Frequency interpolation is then performed across the entire OFDM symbol by the frequency interpolator 220 to form for the upper and lower branches for each data cell of the respective OFDM symbols a sum pilot value $g_s$ and a different pilot value $g_d$. For the upper and lower branches the output from the frequency interpolator 220 is fed to a sum and difference decoder 225 which is formed by adders 222, 224 and scaling processes 236, 238. The first adder 222 of the sum and difference decoder 410 adds the sum pilot value $g_s$ to the difference pilot value $g_d$ from the opposite branch and after scaling by the scaling unit 236 forms samples for the first channel $H_1$. Correspondingly, the lower adder 224 subtracts the difference pilot value $g_d$ from the sum pilot value $g_s$ to form after the scaling unit 238 samples for the second channel $H_2$. After a data carrier enable unit 228 which selects only the CTF coefficients that coincide with data cells, the respective first and second channel samples are down sampled by a down sampling unit 330 to form for each of the respective transmission samples for the transmission channel $H_{D1}$ $H_{D2}$ which are fed via respective outputs 238, 232 to Alamouti decoder 234 which generates the estimates of the transmitted symbols by performing Alamouti decoding such as for example the Alamouti decode shown in FIG. 7. The down sampling unit 330 would be by passed if classic Alamouti decoding is not going to be used.

Positioning of the Interpolator

As will be appreciated with reference to FIGS. 6 and 10, the implementation of the MISO mode channel estimation (MCHC) can be considered as three separate functional blocks: the sum-difference decoding (SDD), the frequency interpolation (FITP) and the Alamouti decoding (ADEC). As discussed above, an advantage is provided by positioning the FITP before the SDD so that only one filter centring operation is needed to cover both channels. This is illustrated in FIG. 11.

Figure 11:
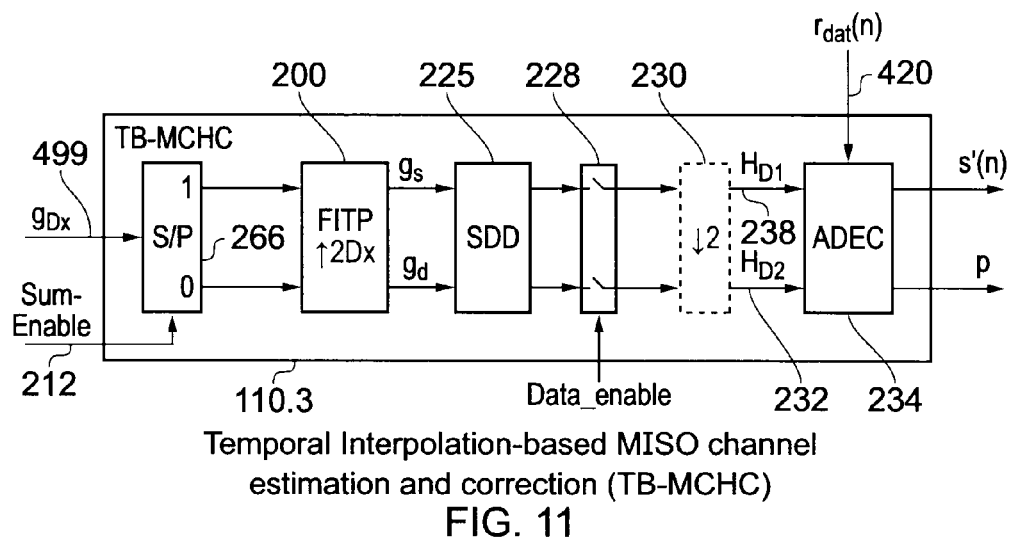
FIG. 11 is a schematic block diagram of a temporal interpolation based MISO channel estimation and correction processor.

FIG. 11 provides a temporal interpolation based MISO channel estimation and correction processor which utilises the Alamouti decoder shown in FIG. 7 in combination with channel estimation processor shown partly in FIG. 6. As shown in FIG. 11 temporally interpolated pilot data samples are fed to a serial to parallel convertor 206 which converts the pilot data samples respectively using a sum enable flag 212 into respective upper and lower branches providing sum pilot values gs and different pilot values $g_d$. The sum pilot values and different pilot values $g_s$ and $g_d$ have already been temporally interpolated as shown in FIG. 5b so that by performing frequency interpolation using the frequency interpolator 200 the sum and difference pilot values can be formed for each of the respective cells of the OFDM symbol. The sum and difference decoder 225 then generates as before the samples of the first and second channels via which the different versions of the OFDM symbols have passed and using a data enabling switch 228 the respective samples of the channel for each of the data symbols are generated. If classic Alamouti decoding is to be used, then down sampling using the down sampling processor 230 is applied. Otherwise, the down sampler is by-passed. The CTF samples for the data cells of the OFDM symbols for the first and second channels are then formed on output channels 238, 232. These again are fed to the Alamouti decoder 234 which also receives on a second input 420 r(n) the received data bearing cells, which are processed by the Alamouti decoder as explained above to form an estimate of the symbols S(n) which are paired, and an estimate of the value ρ which is used to form channel state information for the estimated symbols.

De-Noising Frequency Only MISO Channel Estimates

Figure 12:
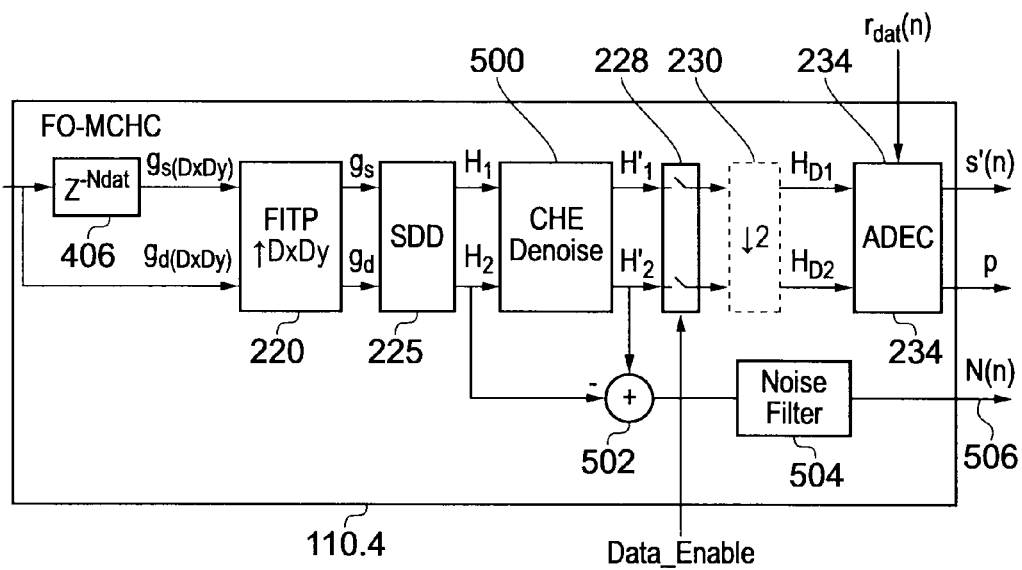
FIG. 12 is a schematic block diagram of a frequency only MISO channel estimation and correction processor.

FIG. 12 provides a further example enhancement of a frequency only MISO channel estimator and corrector 110.4. Parts shown in FIG. 12 correspond to those shown in FIG. 10 and so only the differences will be explained. The channel estimator and corrector 110.4 shown in FIG. 12 corresponds to that shown in FIG. 10, except that further elements are included in order to recover an estimate of noise which has affected the reception of the data symbols. As shown in FIG. 12, a channel estimate de-nosier 500 is shown to receive the respective CTF samples for the first and second channels for the upper and lower branches from the sum and difference decoder 225 before these are received by the data enabling switch 228 to form channel estimates for data symbols. Furthermore a further adder 502 is arranged to subtract a sample of the output of the de-noiser 500 from the second channel $H_2$ from the estimate of the second channel $H_2$ at the input of the de-nosier 500, which is then fed to a noise filter 504 to form, on an output channel 506, an estimate of the noise which has affected the received signals. The noise estimate can be used later to assist in decoding the data symbols.

According to the example provided in FIG. 12, to provide a means for producing a noise power estimate with frequency-only MISO channel estimation and correction (FO-MCHC) a channel estimate de-noising filter 500 is applied, is used, after the sum-difference decoding (SDD), to reduce the long-term noise on the channel estimates. The de-noised channel estimates are then subtracted from the original estimates to get an estimate of the noise. The noise filter 504 processes the noise estimate to provide a noise power estimate for each sub-carrier from which the noise power at each data cell can be determined. Meanwhile the channel estimates $H_{D1}$ and $H_{D2}$ pass into the Alamouti decoding (ADEC) block which performs the equalisation of the data cells $r_{dat}(n)$ to give the estimated cells s'(n) and the power of the estimated cells ρ(n) which will be divided later by the estimated noise N(n) to give the channel state information (CSI) for each data cell.

There are additional requirements for implementing FO-MCHC. These arise because the described FO-MCHC equalises OFDM symbols in pairs.

The buffer shown at the input in FIG. 12 must be large enough to hold all the CTF coefficients from the even symbol. This size is $\max(K_{total}/DxDy)=\max(K_{total})/\min(DxDy)$ where $K_{total}$ is the number of useful sub-carriers in each OFDM symbol and $\max(K_{total})=27841$ from Table 60 of [2] whilst min(DyDx)=12 from Table 1 above. Thus $\max(K_{total}/DxDy)=2321$. This number can be reduced by considering min(DxDy) only for the MISO SP patterns for which FO-MCHC will be used. Functionally, this buffer can be moved to the input of the SDD because it is only in the SDD that $g_s$ and $g_d$ are processed together. However, at this location, a larger buffer (approximately DxDy times larger) would be needed—the actual size would be $\max(K_{total})=27841$.

Another buffer—not shown—is needed to hold the data cells $r_{dat}(n)$ from the even symbol. The size of this buffer would be at least $\max(C_{data})=27152$ from Table 42 of [2].

In FIG. 12, the noise estimation uses $H_{D2}$. However in multipath channels where the delay spread from transmitter antenna 46.1 is substantially different to that from transmitter antenna 46.2, the noise may be computed on both $H_{D1}$ and $H_{D2}$ and their powers averaged. Except for the effects of the filtering both in the de-noising and noise filter blocks, both symbols 2n and 2n+1 should have a common ρ(n) and N(n).

Figures 13, 14:
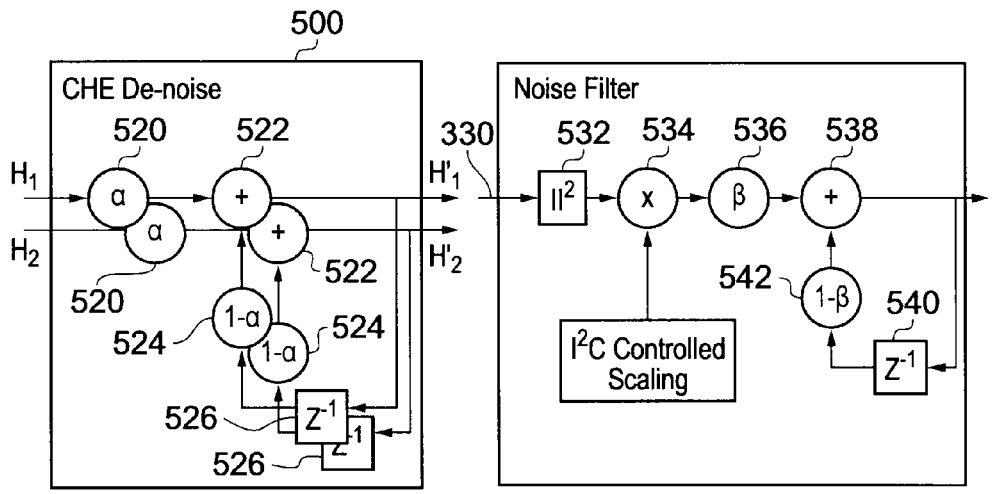
FIG. 13 is a schematic block diagram of a channel estimator de-nosier circuit which appears in FIG. 12.
FIG. 14 is a schematic block diagram of a noise filter for the frequency only channel estimation and correction processor shown in FIG. 12.

An example illustration of the de-noising processor 500 is shown in FIG. 13. In FIG. 13 both estimates of the channel for the upper and lower branches are received correspondingly by a scaling unit 520 which scales each of the samples via value α. An adder 522 adds to the scaled channel samples a delayed version of a previous output from the adder multiplied by further scaling factor 1−α by multipliers 524. The delayed output is produced using the delay circuits 526. Effectively the de-noising unit 500 forms a leaky bucket filter using a scaling factor α to average out the effects of the noise over the respective symbols. Usually α is set to be very much less than 1.

An example of a noise power filter is shown in FIG. 14. In FIG. 14 the difference value between the respective samples of the second estimated channel are fed on an input 530 to a magnitude calculator 532. The magnitude of the estimated noise term is then multiplied by an $I^2C$ (or user) controlled scaling factor by a multiplier 534 before being fed to a scaling multiplier 536. The output of the scaling multiplier 536 is fed to an adder 538 which combines the multiplied sample with a delayed multiplied output from the adder 538 as affected by a delay unit 540 and a multiplier 542. The first and second multipliers 536, 542 scale the received samples by a factor β, 1−β to form again a leaky bucket style filter which uses a value of β of very much less than 1. As such the noise sum magnitude values are filtered to generate an estimate of essentially a difference between successive estimates of channel samples.

Use of FO-MCHC for P2 and FC Symbols

Figure 15:
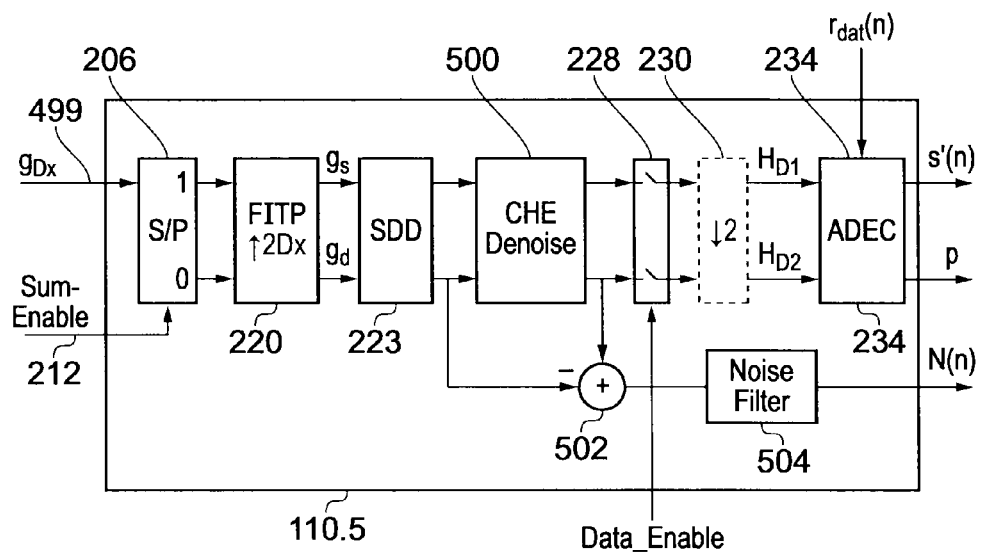
FIG. 15 is a frequency only MISO channel estimation and correction processor for use with P2 and frame closing symbols according to the DVB T standard.

A further example of a frequency only MISO channel estimation and correction unit 110.5 is shown in FIG. 15 where again only the difference between the previous examples will be explained. Essentially the frequency only estimator for the example of the channel estimating corrector 110.5 shown in FIG. 15 corresponds to that shown in FIG. 12 in which all other elements correspond except for the input element. The channel estimator and corrector unit 110.5 as shown in FIG. 15 would be suitable for performing estimation of the channel and Alamouti decoding for OFDM symbols which include sufficient pilots throughout the OFDM symbol which would provide an accurate estimate of the channel difference pilots and the channel sum pilots without requiring samples from other OFDM symbols. Accordingly, there is no delay element 406 as shown for the example in FIG. 12. On the contrary, there is shown in a serial to parallel converter 206 and a sum-enable control input 228 which respectively diverts the received pilot symbol estimates to respective upper and lower branches in accordance with the samples which were available from the received OFDM symbols.

In MISO transmission of DVB-T2, each of a P2 and a frame closing symbol (FCS) both carry sum and difference pilots. These symbols can be equalised using the FO-MCHC but the blocks up to the SDD in FIG. 12 will be replaced by those in FIG. 11, as illustrated in FIG. 15.

Various further aspects and features of the present inventions are defined in the appended claims.

REFERENCES

[1] ETSI, "Digital Video Broadcasting (DVB) Framing structure, channel coding and modulation for digital terrestrial television EN300 744 v1.1.2", August 1997.
[2] DVB, "Digital Video Broadcasting (DVB) Frame structure, channel coding and modulation for a second generation digital terrestrial television broadcasting system (DVB-T2); Draft of EN302 755 v1.1.1", May 2008.
[3] S. M. Alamouti, "A Simple Transmit Diversity Technique for Wireless Communications", IEEE Journal on Select Areas in Communications, vol 16, no. 8, October 1998
[4] A. Vielmon et al., "Performance of Alamouti transmit diversity over time-varying Rayleigh-fading channels", IEEE Transaction on Wireless Communications, vol. 3, n. 5, September 2004
[5] DVB, "Digital Video Broadcasting (DVB-T2) Implementation Guidelines for DVB-T2; Draft of", July. 2008.
[6] Ollie Haffenden, "Alamouti in varying channels", DVB-T2 Doc T2_0283.

The invention claimed is:

1. A receiver for detecting and recovering data from Orthogonal Frequency Division Multiplexed (OFDM) symbols, the OFDM symbols including a plurality of data bearing sub-carriers on which data is transmitted and a plurality of pilot bearing sub-carriers on which pilot data is transmitted, each of the OFDM symbols having been transmitted as a first version of the OFDM symbols via a first channel and a second version of the OFDM symbols via a second channel in accordance with a multiple input-single output system and symbols of the data carried by the sub-carriers of the OFDM symbols are paired to form Alamouti cells, the pairs of data symbols having been encoded differently for the first and second versions of the OFDM symbols in accordance with an Alamouti-type encoding and at least some of the pilot data from the second version being formed as inverted with respect to the corresponding pilot data of the first version of the OFDM symbols, the receiver comprising:

a demodulator arranged in operation to detect a signal representing the OFDM symbols, and to generate a sampled version of the OFDM symbols in the time domain;
a Fourier transform processor arranged in operation to form a frequency domain version of the OFDM symbols; and a channel estimator and corrector comprising:
- a pilot data extractor which is arranged to extract the pilot data from the OFDM symbols;
- a frequency dimension interpolator which is arranged in operation to interpolate between the pilot data received from each the OFDM symbols in the frequency dimension to form sum pilot data and difference pilot data;
- a sum and difference decoder which is arranged in operation to combine the sum and difference pilot data to form for each pair of data symbols of the Alamouti cells an estimate of a sample of the first channel transfer function and an estimate of the sample of the second channel transfer function; and
- an Alamouti decoder which is arranged in operation to receive the data bearing sub-carriers from the OFDM symbols and to estimate the transmitted data symbols by performing Alamouti decoding using the estimates of the samples for the first and second channel transfer functions.

2. The receiver as claimed in claim 1, wherein the OFDM symbols include odd OFDM symbols and even OFDM symbols and for one of the odd and even symbols the second transmitted version is arranged to include inverted pilot data providing pilot data which is inverted with respect to the pilot data in the first version, whereby one of the odd and even OFDM symbols provides sum pilot data and the other of the odd and even OFDM symbols provides difference pilot data, and the channel estimator and corrector includes:
- a delay element which is arranged to receive the OFDM symbols and to store the pilot data from the odd or even OFDM symbols for at least one symbol, and wherein the interpolator is operable to interpolate the pilot data in the frequency dimension for a current OFDM symbol and to interpolate the pilot data in the frequency dimension for the OFDM symbol stored by the delay element to form the sum pilot data and the difference pilot data from the odd and even OFDM symbols.

3. The receiver as claimed in claim 1, wherein the Alamouti decoder is arranged in operation to form, for each estimated data symbol of each pair forming an Alamouti pair, a combination of the sample of the first channel and the sample of the second channel for the first data symbol of the pair and the sample of the first channel and the sample of the second channel for the second data symbol of the Alamouti pair, the combination forming a weighting factor ($\rho$) for each symbol estimate which is representative of a state of the channel when the symbol was estimated, the weighting factor ($\rho$) being used as a channel state indicator for the estimate of the symbol.

4. The receiver as claimed in claim 1, wherein the channel estimator and corrector includes a de-noiser circuit, coupled between the sum and difference decoder and the Alamouti decoder and arranged to filter the estimates of the samples of the first channel and the estimates of the samples of the second channel to form an average value of the estimates for a predetermined number of samples.

5. The receiver as claimed in claim 4, wherein the channel estimator and corrector includes a noise filter which is arranged in operation to generate an estimate of a noise power which is present when each of the estimated data symbols are received by comparing a difference between the estimates of the samples of one of the first and second channels before the de-noiser circuit and the estimates of the samples of the first and second channel after the de-noiser circuit, and filtering the difference, the estimate of the noise power being used to determine a reliability of the accuracy of the estimated data symbol.

6. The receiver as claimed in claim 1, wherein the channel estimator and corrector includes a phase offset generator and first and second multipliers, which are arranged to multiply the sum pilot symbols and the difference pilot symbols respectively by a phase offset value to center the responses from the first and second channel estimates within a frequency bandwidth of the frequency dimension interpolator.

7. A method of detecting and recovering data from Orthogonal Frequency Division Multiplexed (OFDM) symbols, the OFDM symbols including a plurality of data bearing sub-carriers on which data is transmitted and a plurality of pilot bearing sub-carriers on which pilot data is transmitted, each of the OFDM symbols having been transmitted as a first version of the OFDM symbol via a first channel and a second version of the OFDM symbol via a second channel to form a multiple input-single output system and symbols of the data carried by the sub-carriers of the OFDM symbols are paired to form Alamouti pairs, the pairs of data symbols having been encoded differently for the first and second versions of the OFDM symbols in accordance with a modified Alamouti encoding and at least some of the pilot data from the second version being formed as inverted with respect to the corresponding pilot data of the first version of the OFDM symbols, the method comprising:
- detecting a signal representing the OFDM symbols, and generating a sampled version of the OFDM symbols in the time domain;
- forming a frequency domain version of the OFDM symbols by performing a Fourier transform;
- extracting the pilot data from the OFDM symbols;
- interpolating between the pilot data received from each of the OFDM symbols in the frequency dimension to form sum pilot data and difference pilot data;
- combining the sum and difference pilot data to form for each of the data symbols of the Alamouti pairs an estimate of a sample of the first channel and an estimate of the sample of the second channel;
- receiving the data bearing sub-carriers from the OFDM symbols; and
- estimating the data symbols by performing Alamouti decoding using the estimates of the samples for the first and second channels.

8. The method as claimed in claim 7, wherein the OFDM symbols include odd OFDM symbols and even OFDM symbols and for one of the odd and even symbols the second transmitted version is arranged to include inverted pilot data providing pilot data which is inverted with respect to the pilot data in the first version, whereby one of the odd and even OFDM symbols provides sum pilot data and the other of the odd and even OFDM symbols provides even pilot data, and the method further comprises:
- receiving the OFDM symbols at a delay element;
- storing the pilot data from the odd or even OFDM symbols for at least one symbol; and
- the interpolating includes:
- interpolating the pilot data in the frequency dimension for a current OFDM symbol; and
- interpolating the pilot data in the frequency dimension for the OFDM symbol stored by the delay element to form the sum pilot data and the difference pilot data from the odd and even OFDM symbols.

9. The method as claimed in claim 7, wherein the Alamouti decoding includes:
- forming, for each estimated data symbol of each Alamouti pair, a combination of the sample of the first channel and the sample of the second channel for the first data symbol of the pair and the sample of the first channel and the sample of the second channel for the second data symbol of the Alamouti pair, the combination forming a weighting factor ($\rho$) for each symbol estimate which is representative of a state of the channel when the symbol was estimated, the weighting factor ($\rho$) being using as a channel state indicator for the estimate of the symbol.

10. The method as claimed in claim 7, further comprising:
filtering the estimates of the samples of the first channel and the estimates of the samples from the second channel, using a de-noiser circuit to form an average value of the estimates for a predetermined number of samples.

11. The method as claimed in claim 10, further comprising:
generating an estimate of a noise power which is present when each of the estimated data symbols are received by comparing a difference between the estimates of the samples of one of the first and second channels before the de-noiser circuit and the estimates of the samples of the first and second channel after the de-noiser circuit; and
filtering the difference with a noise filter, the estimate of the noise power being used to determine a reliability of the accuracy of the estimated data symbol.

12. The method as claimed in claim 7, further comprising:
multiplying the sum pilot symbols and the difference pilot symbols respectively by a phase offset value to center the response of the first and second channel estimates within a frequency bandwidth of the frequency dimension interpolator before the interpolating.

13. A channel estimator and corrector for an OFDM receiver, the channel estimator and corrector comprising:
a pilot data extractor which is arranged to extract the pilot data from OFDM symbols;
a frequency dimension interpolator which is arranged in operation to interpolate between the pilot data received from each of the OFDM symbols in the frequency domain to form sum pilot data and difference pilot data;
a sum and difference decoder which is arranged in operation to combine the sum and difference pilot data to form for each data symbol of an Alamouti pair an estimate of a sample of a first channel and an estimate of the sample of a second channel; and
an Alamouti decoder which is arranged in operation to receive the data bearing sub-carriers from the OFDM symbols and to estimate the data symbols by performing Alamouti decoding using the estimates of the samples for the first and second channels.

14. A receiver for receiving data from Orthogonal Frequency Division Multiplexed (OFDM) symbols, the receiver comprising:
a demodulator arranged in operation to detect a signal representing the OFDM symbols, and to generate a sampled version of the OFDM symbols in the time domain, the OFDM symbols including a plurality of data bearing sub-carriers on which data is transmitted and a plurality of pilot bearing sub-carriers on which pilot data is transmitted, each of the OFDM symbols having been transmitted as a first version of the OFDM symbols via a first channel and a second version of the OFDM symbols via a second channel in accordance with a multiple input-single output system and symbols of the data carried by the sub-carriers of the OFDM symbols are paired to form Alamouti pairs, the pairs of data symbols having been encoded differently for the first and second versions of the OFDM symbols in accordance with an Alamouti-type encoding and at least some of the pilot data from the second version being formed as inverted with respect to the corresponding pilot data of the first version of the OFDM symbols;
a Fourier transform processor arranged in operation to form a frequency domain version of the OFDM symbols; and
a channel estimator and corrector comprising:
a pilot data extractor which is arranged to extract the pilot data from the OFDM symbols;
a frequency domain interpolator which is arranged in operation to interpolate between the pilot data received from each the OFDM symbols in the frequency dimension to form sum pilot data and difference pilot data;
a sum and difference decoder which is arranged in operation to combine the sum and difference pilot data to form for each data symbol of the Alamouti pairs an estimate of a sample of the first channel and an estimate of the sample of the second channel; and
an Alamouti decoder which is arranged in operation to receive the data bearing sub-carriers from the OFDM symbols and to estimate the data symbols by performing Alamouti decoding using the estimates of the samples for the first and second channels.

15. An apparatus for detecting and recovering data from Orthogonal Frequency Division Multiplexed (OFDM) symbols, the OFDM symbols including a plurality of data bearing sub-carriers on which data is transmitted and a plurality of pilot bearing sub-carriers on which pilot data is transmitted, each of the OFDM symbols having been transmitted as a first version of the OFDM symbol via a first channel and a second version of the OFDM symbol via a second channel to form a multiple input-single output system and symbols of the data carried by the sub-carriers of the OFDM symbols are paired to form Alamouti pairs, the pairs of data symbols having been encoded differently for the first and second versions of the OFDM symbols in accordance with an Alamouti-type encoding and at least some of the pilot data from the second version being formed as inverted with respect to the corresponding pilot data of the first version of the OFDM symbols, the apparatus comprising:
means for detecting a signal representing the OFDM symbols, and to generate a sampled version of the OFDM symbols in the time domain;
means for forming a frequency domain version of the OFDM symbols by performing a Fourier transform;
means for extracting the pilot data from the OFDM symbols;
means for interpolating between the pilot data received from each the OFDM symbols in the frequency dimension to form sum pilot data and difference pilot data;
means for combining the sum and difference pilot data to form for each data symbol of the Alamouti pairs an estimate of a sample of the first channel and an estimate of the sample of the second channel;
means for receiving the data bearing sub-carriers from the OFDM symbols; and
means for estimating the data symbols by performing Alamouti decoding using the estimates of the samples for the first and second channels.

* * * * *